US012769318B2

(12) United States Patent
Harris et al.

(10) Patent No.: US 12,769,318 B2
(45) **Date of Patent: *Oct. 20, 2026**

(54) DYNAMIC AUTONOMOUS VEHICLE TRAIN

(71) Applicant: State Farm Mutual Automobile Insurance Company, Bloomington, IL (US)

(72) Inventors: Steven J. Harris, Saratoga, CA (US); Theobolt N. Leung, San Francisco, CA (US); Jay T. Hieb, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/822,380

(22) Filed: Sep. 2, 2024

(65) Prior Publication Data

US 2024/0419176 A1 Dec. 19, 2024

Related U.S. Application Data

(63) Continuation of application No. 17/978,467, filed on Nov. 1, 2022, now Pat. No. 12,079,008, which is a (Continued)

(51) Int. Cl.
*G05D 1/00* (2024.01)
*G05D 1/693* (2024.01)
(Continued)

(52) U.S. Cl.
CPC ......... *G05D 1/0293* (2013.01); *G05D 1/0088* (2013.01); *G05D 1/0289* (2013.01);
(Continued)

(58) Field of Classification Search
CPC ...... G05D 1/00; G05D 1/0088; G05D 1/0289; G05D 1/0293; G05D 1/693; G05D 1/695;
(Continued)

(56) References Cited

U.S. PATENT DOCUMENTS

| | | | |
|---|---|---|---|
| 5,586,030 | A | 12/1996 | Kemner et al. |
| 8,352,112 | B2 | 1/2013 | Mudalige |

(Continued)

FOREIGN PATENT DOCUMENTS

| | | | |
|---|---|---|---|
| CA | 3008512 | A1 | 12/2018 |
| CA | 3092443 | A1 | 9/2019 |

(Continued)

*Primary Examiner* — Atul Trivedi
(74) *Attorney, Agent, or Firm* — BRYAN CAVE LEIGHTON PAISNER LLP

(57) ABSTRACT

A computer-implemented method of directing an autonomous vehicle to join an autonomous vehicle train, the computer-implemented method including: receiving, via at least one of one or more processors or associated transceivers of the autonomous vehicle train, a request from a requesting autonomous vehicle that is not part of the autonomous vehicle train to join the autonomous vehicle train along a route; determining, using autonomous vehicle data, a rendezvous point along the route; transmitting, a communication to the requesting autonomous vehicle authorizing the requesting autonomous vehicle to join the autonomous vehicle train at the rendezvous point along the route; and directing the requesting autonomous vehicle to join the autonomous vehicle train at the rendezvous point along the route. Other embodiments are described.

20 Claims, 9 Drawing Sheets

Related U.S. Application Data continuation of application No. 16/872,443, filed on May 12, 2020, now Pat. No. 11,520,354, which is a continuation of application No. 16/057,937, filed on Aug. 8, 2018, now Pat. No. 10,698,421.

(60) Provisional application No. 62/568,562, filed on Oct. 5, 2017, provisional application No. 62/562,942, filed on Sep. 25, 2017.

(51) Int. Cl.

*G05D 1/695* (2024.01)
*G05D 1/81* (2024.01)
*G08G 1/00* (2006.01)
*H04W 4/42* (2018.01)

(52) U.S. Cl.

CPC ............. *G05D 1/693* (2024.01); *G05D 1/695* (2024.01); *G05D 1/81* (2024.01); *G08G 1/22* (2013.01); *H04W 4/42* (2018.02)

(58) Field of Classification Search

CPC . G05D 1/81; G08G 1/22; H04W 4/02; H04W 4/024; H04W 4/027; H04W 4/40; H04W 4/42; H04W 4/80
USPC ............................................................ 701/25
See application file for complete search history.

(56) References Cited

U.S. PATENT DOCUMENTS 9,165,470 B2 10/2015 Mudalige et al.
9,355,423 B1 5/2016 Slusar
9,390,451 B1 7/2016 Slusar
9,606,539 B1 3/2017 Kentley et al.
9,751,532 B2 9/2017 Gordon et al.
9,817,404 B1 11/2017 Loo et al.
9,841,286 B1 12/2017 Hayward
9,841,287 B1 12/2017 Hayward
9,940,676 B1 4/2018 Biemer
9,940,840 B1 4/2018 Schubert et al.
10,096,067 B1 10/2018 Slusar
10,397,019 B2 8/2019 Hartung et al.
10,545,024 B1 1/2020 Konrardy et al.
10,599,155 B1 3/2020 Konrardy et al.
10,698,421 B1 * 6/2020 Harris ..................... H04W 4/42
10,948,927 B1 * 3/2021 Harris ..................... H04W 4/42
11,242,051 B1 2/2022 Konrardy et al.
2003/0182183 A1 9/2003 Pribe
2014/0113619 A1 4/2014 Tibbitts et al.
2015/0153733 A1 6/2015 Ohmura et al.
2015/0246672 A1 9/2015 Pilutti et al.
2015/0379468 A1 12/2015 Harvey
2016/0071418 A1 3/2016 Oshida et al.
2016/0129917 A1 5/2016 Gariepy et al.
2016/0247106 A1 8/2016 Dalloro et al.
2016/0267796 A1 * 9/2016 Hiroma ................. B60W 50/14
2016/0357187 A1 12/2016 Ansari
2016/0357188 A1 12/2016 Ansari
2016/0357262 A1 12/2016 Ansari
2016/0358477 A1 12/2016 Ansari
2017/0072967 A1 3/2017 Fendt et al.
2017/0076603 A1 3/2017 Bostick et al.
2017/0113707 A1 4/2017 Ghaly
2017/0123421 A1 5/2017 Kentley et al.
2017/0123422 A1 5/2017 Kentley et al.
2017/0124658 A1 5/2017 Gordon et al.
2017/0132334 A1 5/2017 Levinson et al.
2017/0132708 A1 5/2017 Gordon et al.
2017/0168502 A1 6/2017 Gordon et al.
2017/0168503 A1 6/2017 Amla et al.
2017/0232943 A1 * 8/2017 Brooks .................... G08G 1/22
701/19
2017/0255198 A1 9/2017 Rodriguez
2017/0255966 A1 9/2017 Khoury
2017/0262790 A1 * 9/2017 Khasis ............... G01C 21/3415
2017/0293296 A1 10/2017 Stenneth et al.
2017/0308097 A1 * 10/2017 Switkes .................. H04W 4/44
2017/0312614 A1 11/2017 Tran et al.
2017/0318360 A1 11/2017 Tran et al.
2017/0337813 A1 * 11/2017 Taylor .................. G05D 1/0285
2017/0344023 A1 * 11/2017 Laubinger ........... B60W 30/165
2017/0355295 A1 12/2017 Gutowitz
2017/0364080 A1 12/2017 Chintakindi
2017/0372431 A1 12/2017 Perl et al.
2018/0018605 A1 1/2018 Light-holets et al.
2018/0059687 A1 3/2018 Hayes et al.
2018/0127001 A1 5/2018 Ricci
2018/0174449 A1 6/2018 Nguyen
2018/0186208 A1 7/2018 Coombs
2018/0307247 A1 10/2018 Taniguchi
2018/0373268 A1 12/2018 Antunes Marques
2018/0375939 A1 12/2018 Magalhães De
2018/0376357 A1 12/2018 Tavares et al.
2019/0016341 A1 1/2019 Nelson
2019/0035267 A1 1/2019 Balzer et al.
2019/0100216 A1 4/2019 Volos et al.
2019/0118805 A1 4/2019 Lim
2019/0150357 A1 5/2019 Wu et al.
2019/0248396 A1 8/2019 Khosla
2019/0389498 A1 12/2019 Grimm et al.
2020/0200563 A1 6/2020 Martin et al.
2020/0201353 A1 6/2020 Martin et al.
2020/0264634 A1 * 8/2020 Hadi ................. B60W 60/0023
2021/0027482 A1 1/2021 Naik et al.
2021/0089048 A1 3/2021 Tran
2021/0104160 A1 4/2021 Gao et al.
2021/0131813 A1 5/2021 Chen et al.
2021/0150910 A1 5/2021 Oberhofer et al.
2021/0200243 A1 7/2021 Chen et al.
2021/0256616 A1 8/2021 Hayward et al.
2022/0005291 A1 1/2022 Konrardy et al.
2023/0110300 A1 * 4/2023 Lei .................... B60W 60/0023
701/25
2023/0228588 A1 * 7/2023 Lee .................... G01C 21/3881
701/455
2023/0324188 A1 10/2023 Tam et al.
2025/0166511 A1 * 5/2025 Hendrickson ..... B60W 60/0025

FOREIGN PATENT DOCUMENTS

EP 4145091 A1 * 3/2023 ......... G01C 21/3647
FR 3097356 A1 * 12/2020 ............... G08G 1/22
SE 1650095 A1 7/2017
SE 1650096 A1 7/2017
SE 1650093 A1 8/2017
WO 2015114592 A1 8/2015
WO WO-2016109670 A1 * 7/2016 ........... G01C 21/343
WO 2017142917 A1 8/2017
WO 2019201412 A1 10/2019
WO 2021142016 A1 7/2021

* cited by examiner

DYNAMIC AUTONOMOUS VEHICLE TRAIN

CROSS-REFERENCE TO RELATED APPLICATIONS

The application is a continuation of U.S. patent application Ser. No. 17/978,467, filed on Nov. 1, 2022, to be issued as U.S. Pat. No. 12,079,008, which is a continuation of U.S. patent application Ser. No. 16/872,443, filed May 12, 2020, issued as U.S. Pat. No. 11,520,354, which is a continuation of U.S. patent application Ser. No. 16/057,937, filed Aug. 8, 2018, issued as U.S. Pat. No. 10,698,421, which claims the benefit of U.S. Provisional Patent Application No. 62/568,562, filed Oct. 5, 2017 and U.S. Provisional Patent Application No. 62/562,942, filed Sep. 25, 2017, where upon each of the above listed U.S. Patent Applications, U.S. Patent Provisional Applications, and U.S. Patents are herewith incorporated by reference in their entireties.

TECHNICAL FIELD

The present disclosure generally relates to systems and methods for autonomous or semi-autonomous vehicle control, and more particularly to control and adjusting autonomous vehicle trains and/or convoys.

BACKGROUND

Vehicles are typically operated by a human vehicle operator who controls both steering and motive controls. Operator error, inattention, inexperience, misuse, or distraction may lead to many vehicle collisions each year, resulting in injury and damage. Autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, and/or may include a plurality of advanced sensors, capable of providing significantly more data (both in type and quantity) than is available even from GPS navigation assistance systems installed in traditional vehicles.

However, intermingling conventional traffic flow and patterns with autonomous or semi-autonomous vehicles may create, or be associated with, inefficiencies, ineffectiveness, safety issues, inconveniences, untimeliness, and/or other drawbacks.

SUMMARY

The present embodiments may be related to, inter alia, autonomous or semi-autonomous vehicle trains and/or convoys, referred to as AVTs (Autonomous Vehicle Trains) herein. An AVT may include several autonomous or semi-autonomous vehicles and be either, locally or remotely, directed to one or more destinations or rendezvous points (or way points) along a route. For instance, a lead vehicle leading the AVT may dynamically control the direction, speed, route, heading, and/or other operations of the AVT, such as based upon environmental, traffic, or road conditions. The lead vehicle may locally determine AVT heading, route, direction, speed, etc., or may receive control directions from a remote controller or server, or smart infrastructure. Autonomous or semi-autonomous vehicles looking to join, or rendezvous with, the AVT, such as at a way point, may be in wireless communication with the lead vehicle or a remote controller to enable directing or controlling (either locally or remotely) the autonomous or semi-autonomous vehicle to meet up with the AVT at a way or rendezvous point while the AVT is either moving or stationery.

In one aspect, a computer-implemented method for an autonomous vehicle to dynamically rendezvous with, and/or join, an autonomous vehicle train en-route or moving may be provided. The method may include (1) establishing, via one or more processors and/or associated transceivers of an autonomous vehicle, communication (either directly or indirectly) with a lead (or other) vehicle of an Autonomous Vehicle Train (AVT) (such as via wireless communication or data transmission over one or more radio frequency links or communication channels); (2) receiving, via the one or more processors and/or associated transceivers of the autonomous vehicle (such as via wireless communication or data transmission over one or more radio frequency links or communication channels), information detailing AVT operation (AVT operational data); (3) determining, via the one or more processors of the autonomous vehicle, a rendezvous point or location to meet and/or join the AVT based upon (i) the AVT operational data; and/or (ii) autonomous vehicle operational data; and/or (4) automatically maneuvering, via the one or more processors of the autonomous vehicle, the autonomous vehicle to the rendezvous point to facilitate the autonomous vehicle dynamically joining the AVT while the AVT remains moving and is en-route toward a destination of the autonomous vehicle (or a way point along the AVT route). The method may include additional, less, or alternate actions, including those discussed elsewhere herein.

In another aspect, a computer-implemented method of dynamically allowing an autonomous vehicle to join, rendezvous with, recognize, and/or travel with an Autonomous Vehicle Train (AVT) may be provided. The method may include (1) establishing, via one or more processors and/or associated transceivers of an autonomous vehicle (such as via wireless communication or data transmission over one or more radio frequency links or communication channels), communication, either directly or indirectly, with a lead (or other) vehicle of the AVT; (2) receiving, via the one or more processors and/or associated transceivers of the autonomous vehicle (such as via wireless communication or data transmission over one or more radio frequency links or communication channels), identifying vehicle information of the lead vehicle of the AVT (and/or identifying information of other vehicles currently in the AVT, such as identifying information of a rear vehicle); (3) receiving, via the one or more processors and/or associated transceivers of the autonomous vehicle (such as via wireless communication or data transmission over one or more radio frequency links or communication channels), travel (or route) information of the AVT; (4) determining, via the one or more processors of the autonomous vehicle, a location to rendezvous with, and/or join, the AVT; (5) recognizing, via the one or more processors, associated transceivers, and/or vehicle-mounted sensors of the autonomous vehicle, the lead vehicle of the AVT (or another vehicle or vehicles of the AVT, e.g., the rear vehicle); and/or (6) maneuvering (or otherwise directing or controlling), via the one or more processors, the autonomous vehicle to join the AVT to facilitate the autonomous vehicle joining, rendezvousing with, and/or traveling in conjunction with the AVT to a mid or final destination of either the AVT or the autonomous vehicle. The autonomous vehicle may be directed to join the AVT while the AVT is moving, or alternatively, stationery. The various actions of the method may be performed locally, such on a processor of the autonomous vehicle, or remotely on lead, rear, or other vehicle of the AVT, a remote server, and/or smart infrastructure. The method may include additional, less, or alternate actions, including those discussed elsewhere herein.

In another aspect, a computer-implemented method of controlling an Autonomous Vehicle Train (AVT) via a lead vehicle of the AVT may be provided. The method may include (1) estimating or determining, via one or more processors of the lead vehicle, a time-of-arrival at several way points along an AVT route; (2) generating or determining, via one or more processors of the lead vehicle, a travel schedule that includes the time-of-arrival at several way points along an AVT route; (3) transmitting, via the one or more processors and/or associated transceivers of the lead vehicle (such as via wireless communication or data transmission over one or more radio links or communication channels), the travel schedule to one or more autonomous vehicles; (4) receiving, via the one or more processors and/or associated transceivers of the lead vehicle (such as via wireless communication or data transmission over one or more radio links or communication channels), an electronic request to join the AVT at a specific location along the AVT route, or at a specific way point along the AVT route, from an autonomous vehicle; and/or (5) transmitting, via the one or more processors and/or associated transceivers of the lead vehicle (such as via wireless communication or data transmission over one or more radio links or communication channels), an electronic receipt to the autonomous vehicle to facilitate allowing the autonomous vehicle joining, or rendezvousing with, the AVT at a specific location, or a way point, along the AVT route, and enhancing the travel experience. The method may include additional, less, or alternate actions, including those discussed elsewhere herein.

In one aspect, a computer-implemented method of remotely or locally dynamically controlling or adjusting vehicles within an Autonomous Vehicle Train (AVT) may be provided. The method may include (1) adjusting, via one or more processors and/or associated transceivers, a speed of two or more autonomous vehicles in an AVT to be a same speed; (2) adjusting, via one or more processors and/or associated transceivers, a distance between two or more autonomous vehicles in an AVT, or a following distance for each autonomous vehicle in the AVT, to be a same distance; and/or (3) adjusting, via one or more processors and/or associated transceivers, a spacing and/or speed of the two or more autonomous vehicles in the AVT to facilitate the AVT accepting a new autonomous vehicle while the both the AVT and the autonomous vehicle are en-route or moving toward an intermediary or final destination. The method may include additional, less, or alternate actions, including those discussed elsewhere herein.

Systems or computer-readable media (or mediums) storing instructions for implementing all or part of the system described above may also be provided in some aspects. Systems and/or vehicles for implementing such methods may include one or more of the following: a mobile computing device, an on-board computer, a remote server, one or more sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

A number of embodiments can include a computer-implemented method of directing an autonomous vehicle to join an autonomous vehicle train. The computer-implemented method can include receiving, via at least one of one or more processors or associated transceivers of the autonomous vehicle train, a request from a requesting autonomous vehicle that is not part of the autonomous vehicle train to join the autonomous vehicle train along a route. The computer-implemented method also can include determining, using autonomous vehicle data, a rendezvous point along the route. The computer-implemented method further can include transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route. The computer-implemented method additionally can include directing, via the at least one of the one or more processors or the associated transceivers of the autonomous vehicle train, the requesting autonomous vehicle to join the autonomous vehicle train at the rendezvous point along the route.

Several embodiments can include a system including one or more processors and one or more non-transitory computer-readable media storing computing instructions that, when executed on the one or more processors, cause the one or more processors to perform operations. The operations can include receiving, via at least one of one or more processors or associated transceivers of the autonomous vehicle train, a request from a requesting autonomous vehicle that is not part of the autonomous vehicle train to join the autonomous vehicle train along a route. The operations also can include determining, using autonomous vehicle data, a rendezvous point along the route. The operations further can include transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route. The operations additionally can include directing, via the at least one of the one or more processors or the associated transceivers of the autonomous vehicle train, the requesting autonomous vehicle to join the autonomous vehicle train at the rendezvous point along the route.

Various embodiments can include one or more non-transitory computer-readable media storing computing instructions than when executed by one or more processors, cause the one or more processors to perform operations. The operations can include receiving, via at least one of one or more processors or associated transceivers of the autonomous vehicle train, a request from a requesting autonomous vehicle that is not part of the autonomous vehicle train to join the autonomous vehicle train along a route. The operations also can include determining, using autonomous vehicle data, a rendezvous point along the route. The operations further can include transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route. The operations additionally can include directing, via the at least one of the one or more processors or the associated transceivers of the autonomous vehicle train, the requesting autonomous vehicle to join the autonomous vehicle train at the rendezvous point along the route.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1A:
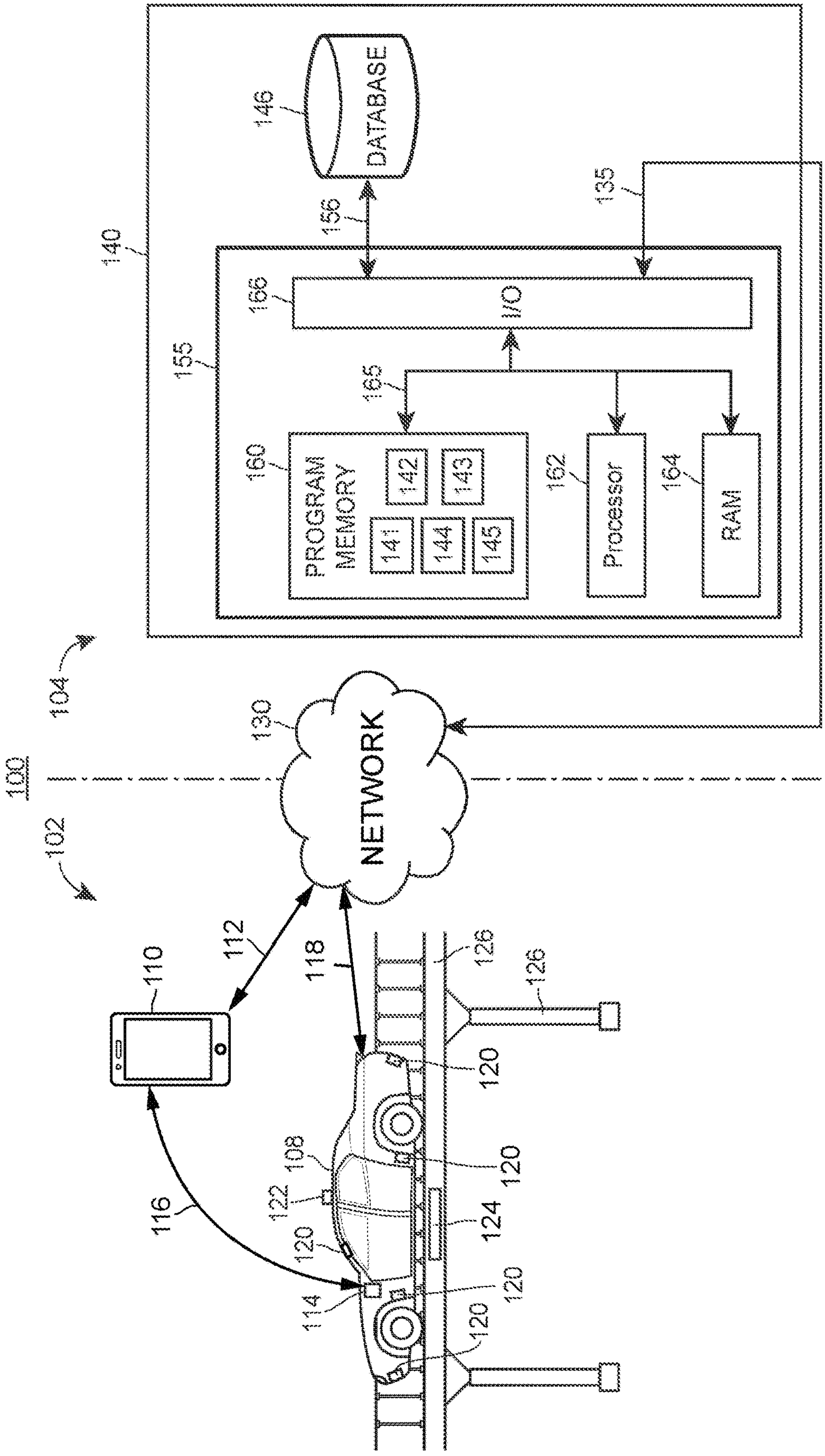
FIG. 1A illustrates a block diagram of an exemplary autonomous vehicle data system for autonomous vehicle operation, monitoring, and related functions.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present embodiments are related to, inter alia, autonomous vehicles being dynamically directed to rendezvous with autonomous vehicle trains or convoys. Current location and/or route information of an Autonomous Vehicle Train (AVT) may be wirelessly received by an autonomous vehicle, or mobile device traveling therein. The autonomous vehicle may compare its current location and/or route information to determine a rendezvous point with the AVT, which may be a way point along a route to an ultimate destination. The autonomous vehicle may route or drive itself to a rendezvous point with the AVT.

Once there, the autonomous vehicle may verify the identification of the AVT, such as by using sensors/cameras to verifying a lead, rear, or other vehicle of the AVT (e.g., by verifying make/model, color, license plate, or other verifying information). The autonomous vehicle and lead vehicle (and/or other vehicles of the AVT) may communicate to allow the autonomous vehicle and/or AVT to both or singly maneuver to allow the autonomous vehicle to join the AVT. A minimum level of autonomous vehicle functionality may be verified prior to the autonomous vehicle being allowed to join the AVT. As a result, vehicle traffic flow and traveling experience by passengers may be enhanced.

The present embodiments may include developing an App that would help to organize drivers and vehicles that are autonomous or semi-autonomous into trains of vehicles traveling together. The trains may operate across vehicle OEMs (Original Equipment Manufacturers), but the OEM vehicles may have to be certified to join the train, at least in some embodiments. Each autonomous vehicle may be placed in a "category" of train based upon their grade of autonomous features and/or software, or amount of autonomous vehicle technology installed, or capability thereof.

For instance, vehicles with adaptive cruise control, and lane sensing may be placed or characterized in a lowest category, e.g., "Bronze." More autonomous features in, or of, the vehicle may raise the category (e.g., "Silver," "Gold," "Platinum," "Preferred," etc.) the vehicle is placed in, or characterized as. Lower categories of vehicles may not be able to participate in higher category trains, such as trains with the most advanced autonomous technology. For instance, vehicles may only be allowed to join autonomous vehicle trains for which they qualify for.

Within the App there may be a leader board based upon various factors, such as safe driving (which may be detected from a telematics app, or other apps associated with driving or vehicle operation), most time in train or traveling with an AVT for a specific autonomous vehicle, etc. Special privileges for levels and activities may also be offered, such as to a specific autonomous vehicle, and/or vehicle operators or owners. For example, drivers or specific autonomous vehicles may be made the lead car in the AVT, or other perks may be provided, such as reduced insurance rates or other types of incentives.

In one aspect, an insurance provider may partner with one or more OEMs to develop an API to go into and out of "train mode" across the OEMs. In one embodiment, the App and/or system may tie into various databases in wireless communication with one another, and may include Waze, highway patrol systems, smart infrastructure, etc. to learn road, traffic, environmental, weather, and/or other conditions ahead of the AVT (or along predetermined routes, predetermined way points, or alternative routes of the AVT) that may possibly slow, impede, impact, or divert the movement of the AVT, or potentially separate vehicles from the AVT based upon current, real-time, predicted, or anticipated conditions.

The autonomous train mode of operating several vehicles may be safer and more efficient than individual vehicles jockeying for position, such as during normal traffic conditions and/or congestion caused by rush-hour, construction, weather, vehicle collision, traffic, road conditions, etc.

The present embodiments may involve recruiting drivers in different areas around the country and/or may kick start the usage of safe and reliable AVTs. For instance, drivers, autonomous vehicles, and/or autonomous vehicle functionality/technology that exhibit good or above average risk characteristics, such as being risk averse or having low risk driver or operating characteristics, may be designated as leaders, such as to be lead vehicles for AVTs that other autonomous vehicles would follow.

In certain embodiments, the preferred or recommended autonomous vehicles, or even drivers, may be the flag bearers of a specific brand, and may be entitled to certain benefits or rewards, including lower insurance rates. Additionally, the qualified or vetted "leaders" of the AVT may have the ability to determine when it would be safe to be in "train mode." Safety of a train mode may be based upon, at least in part, the autonomous functionality of each vehicle, and/or the road, traffic, weather, environmental, construction, geography, and/or other driving factors.

These special ambassadors (individual autonomous vehicles or drivers) for the App and/or brand may be given a special item to identify them. As an example, the item may be a leather jacket with a brand designated emblem to signify their status, including a vehicle marking. The brand-related, or lead vehicle status-related items, may be akin to an aviation metaphor for a lead pilot, or the lead plane in the Blue Angels, etc.

Further, Tesla or electric vehicle power chargers may be an interesting location to meet with other autonomous vehicle and/or other vehicle drivers. Co-branded jackets may be given to these drivers to designate their special or verified status at the charging station. As a result, the leader of the AVT may be easily recognizable. The App or system may facilitate kick starting the usage of semi or total autonomous driving, and potentially turn a dreaded or mundane commute into a fun thing.

Eventually the interconnected computer system may require vehicle to cloud interaction or wireless communication to function. The computer system may need to be, or be associated with, a mobile phone app (App) capable of real-time wireless communication with other autonomous vehicles, other driver mobile devices, and/or smart infrastructure. The App may also employ gaming aspects in some embodiments.

Wireless Communication Among Vehicles

The vehicles within in the AVT or wanting to join the AVT may communicate among each other, such as via V2V (vehicle-to-vehicle), mobile device-to-mobile device (P2P (Peer-to-Peer)), or other wireless communication techniques. The vehicles may additionally wirelessly communicate with remote servers of 3rd parties, such as an insurance provider or government remote server, and/or smart infrastructure (smart traffic lights, smart road markers, smart exit or on ramps, smart toll booths, smart bridges, etc.).

Directions or commands directing either the autonomous vehicle and/or one or more vehicles in the AVT (e.g., lead vehicle) may be determined locally or remotely for each vehicle. For instance, directions or commands for the AVT or lead vehicle may be determined remotely (such as from a remote server), and transmitted to the lead vehicle. The lead vehicle may, in turn, communicate directions or control decisions with the other vehicles in the AVT, such as via V2V, to direct and control the AVT.

The autonomous vehicle seeking to join the AVT may wirelessly receive route and travel for the AVT, either directly or indirectly, from one of the vehicles in the AVT, or from a remote server over one or more radio links. The autonomous vehicle may then determine a route, speed, and/or other control decisions to operate the autonomous vehicle to a rendezvous or way point of the AVT's intended path.

Additionally or alternatively, the autonomous vehicle may transmit its current location and its intended destination to a remote server. The remote server may identify a specific AVT for the autonomous vehicle to join. The remote server may determine a route and speed for the autonomous vehicle to take to join the AVT at a given rendezvous point. The remote server may transmit the route and speed to the autonomous vehicle, and/or verify that the autonomous vehicle is qualified to join the AVT. After which, the autonomous vehicle may use information received from the remote server to maneuver or drive itself to the rendezvous point, and then recognize and/or join the AVT, while the AVT is in either en-route or refueling.

In some embodiments, the autonomous vehicle may be in wireless communication with an insurance provider remote server. The insurance provider remote server may determine and transmit insurance quotes to the autonomous vehicle in real-time or near real-time. The insurance quote may be accepted by the autonomous vehicle or a passenger in the autonomous vehicle. The insurance quote may be for usage-based insurance (UBI), such as pay-by-mile or pay-by-time insurance. For instance, UBI or an UBI rate, or UBI discount, may be based upon the autonomous features of the autonomous vehicle, the autonomous features of the AVT, the route of the AVT, the portion of the route of the AVT that the autonomous vehicle will travel (such as from way point B to way point E), and/or current or predicted conditions (road, weather, traffic, environmental, weather, geography, and/or other factors) for the autonomous vehicle to (i) rendezvous with, and join, the AVT, (ii) travel with the AVT, and (iii) then disembark the AVT, and travel to a final destination.

Exemplary Autonomous Functionality

The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

Optimal route planning for fully or partially autonomous vehicles may be provided using the systems and methods described herein. A user may input an origin and a destination (e.g., A and B locations), whether they want to drive fully autonomous or take the fastest route, and/or whether they will need to park the vehicle nearby or close to the destination. Routes may be optimized for private passengers based upon road safety for autonomous vehicles (e.g., predetermined "safe for autonomous vehicle" roads), whether or not the roads allow autonomous vehicles, or other factors (e.g., routes with the least manual intervention required, fastest routes, etc.). Alerts may be provided or generated when the autonomous vehicle is approaching an area or road where manual intervention may be needed.

Optimal routes may also be determined for carpooling or vehicle sharing, delivery or other commercial use, emergency response (e.g., a "self-driving to hospital" mode), non-driving passenger pick-up and drop-off (e.g., children, elderly, etc.), autonomous parking and retrieval, or other purposes. In some embodiments, vehicle-infrastructure technology may be used and/or collect data to develop a most efficient/safest route. The presence of smart stoplights, railroad crossings, and other infrastructure may be mapped, and routes may be optimized to include traveling by the most incidences of smart infrastructure.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network. These and other advantages are further described below.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle. Moreover, combinations of autonomous operation features may further affect operating risks due to synergies or conflicts between features. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Exemplary Autonomous Vehicle Operation System

FIG. 1A illustrates a block diagram of an exemplary autonomous vehicle data system 100 on which the exemplary methods described herein may be implemented. The autonomous vehicle 108 depicted may be used with the present embodiments. For instance, the autonomous vehicle 108 may be a lead, rear, or other vehicle of an AVT. Additionally or alternatively, the autonomous vehicle 108 may be an autonomous vehicle seeking to rendezvous with, and/or join the AVT.

As depicted, the high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone or other mobile device, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108 (e.g., via GPS coordinates, dead reckoning, wireless signal triangulation, etc.). Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more (local or remote) servers 140. Including 3rd party remote servers. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases).

The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a risk mapping application 143 for determining the risks associated with autonomous operation feature use along a plurality of road segments associated with an electronic map, a route determination application 144 for determining routes suitable for autonomous or semi-autonomous vehicle operation, and an autonomous parking application 145 for assisting in parking and retrieving an autonomous vehicle. The various software applications may be executed on the same computer processor or on different computer processors.

Exemplary Autonomous Vehicle Monitoring System

Figure 1B:
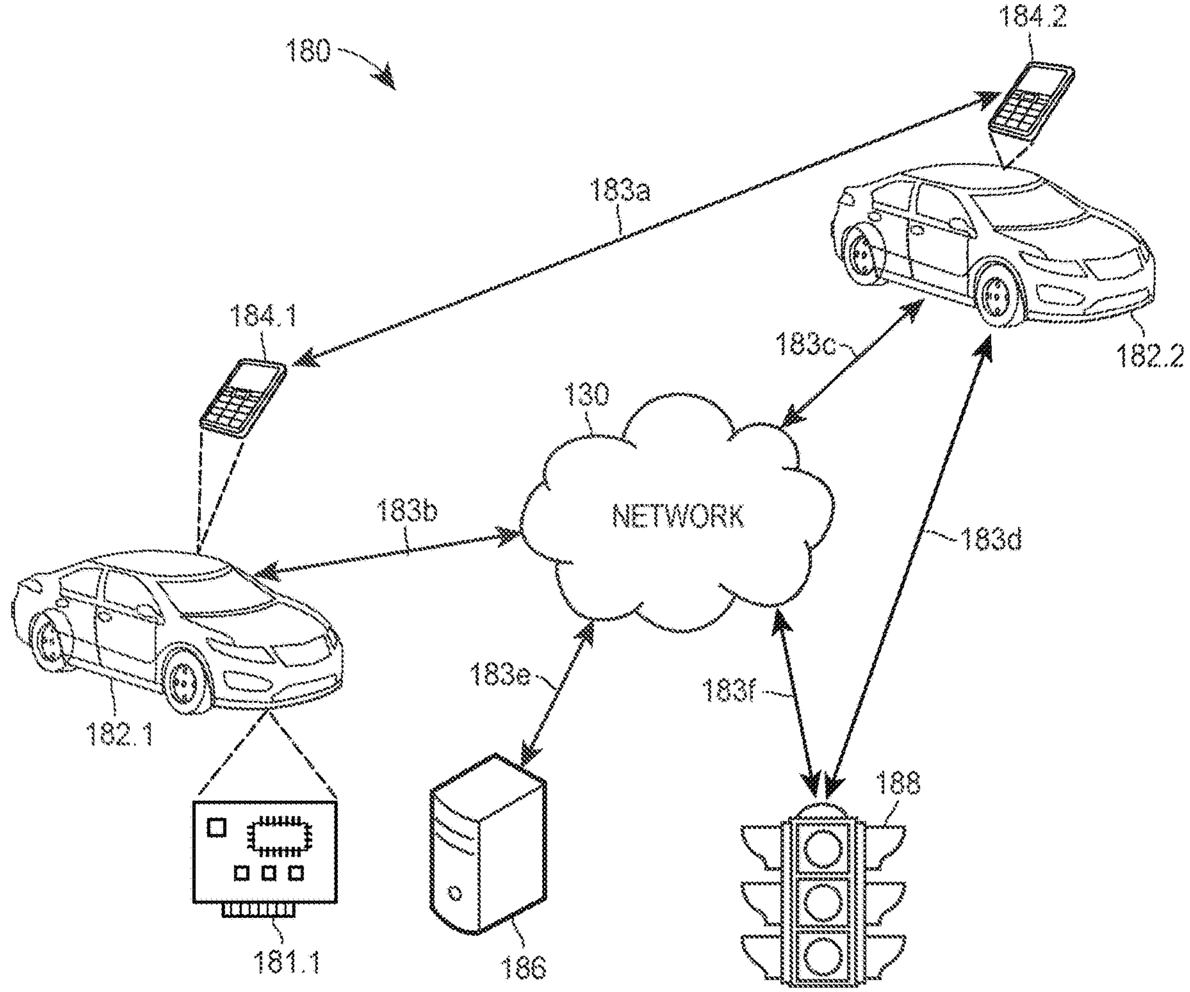
FIG. 1B illustrates a block diagram of an exemplary autonomous vehicle monitoring system, showing a plurality of vehicles and smart infrastructure components.

FIG. 1B illustrates a block diagram of an exemplary autonomous vehicle monitoring system 180 on which the exemplary methods described herein may be implemented. Again, the vehicles 182.1 and 182.2 depicted may be autonomous vehicles discussed herein, and may be the lead, rear, or other autonomous vehicle in an AVT, or an autonomous vehicle seeking to rendezvous with, and/or join, the AVT.

In one aspect, system 180 may include a network 130, N number of vehicles 182.1-182.N and respective mobile computing devices 184.1-184.N, an external computing device 186, and/or a smart infrastructure component 188. In another aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features.

As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as Vehicle-to-Vehicle (V2V) wireless communication and/or data transmission via the communication component 122, directly via the mobile computing devices 184, or otherwise.

Although system 180 is shown in FIG. 1A as including one network 130, two mobile computing devices 184.1 and 184.2, two vehicles 182.1 and 182.2, one external computing device 186, and/or one smart infrastructure component 188, various embodiments of system 180 may include any suitable number of networks 130, mobile computing devices 184, vehicles 182, external computing devices 186, and/or infrastructure components 188. The vehicles 182 included in such embodiments may include any number of vehicles 182.*i* having vehicle controllers 181.*n* (such as vehicle 182.1 with vehicle controller 181.1) and vehicles 182.*j* not having vehicles controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via Peer-to-Peer (P2P) wireless communication and/or data transfer over a radio link or wireless communication channel. In other aspects, each of mobile computing devices 184.1 and 184.2 may be configured to communicate indirectly with one another and/or any suitable device via communications over network 130, such as external computing device 186 and/or smart infrastructure component 188, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1.

In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Still further, one or more of mobile computing devices 184.1 and/or 184.2 may also be configured to communicate with one or more smart infrastructure components 188 directly (e.g., via radio link 183*d*) and/or indirectly (e.g., via radio links 183*c* and 183*f* via network 130) using any suitable communication protocols.

Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*.

As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*f* may represent wired links, wireless links, or any suitable combination thereof. For example, the links 183*e* and/or 183*f* may include wired links to the network 130, in addition to, or instead of, wireless radio connections.

In some embodiments, the external computing device 186 may medicate communication between the mobile computing devices 184.1 and 184.2 based upon location or other factors. In certain embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary.

For example, in some aspects, mobile computing device 184.1 may broadcast geographic location data and/or telematics data directly to mobile computing device 184.2. In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2 may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications. Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. The user profile may further include information regarding user skill or risk levels in operating a vehicle manually or using semi-autonomous operation features, which information may vary by location, time, type of operation, environmental conditions, etc. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140 as discuses elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g., cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions.

Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may facilitate the receipt of autonomous operation or other data from one or more mobile computing devices 184.1-184.N, which may each be running a Data Application to obtain such data from autonomous operation features or sensors 120 associated therewith.

In certain aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N over one or more radio frequency links or wireless communication channels.

In some aspects, external computing device 186 may facilitate indirect communications between one or more of mobile computing devices 184, vehicles 182, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a traffic light, a railroad crossing signal, a construction notification sign, a roadside display configured to display messages, a billboard display, a parking garage monitoring device, etc.

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183*d* and/or with mobile computing device 184.1 via links 183*b* and 183*f* utilizing network 130. As another example, smart infrastructure component 188 may communicate with external computing device 186 via links 183*e* and 183*f* utilizing network 130.

To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Exemplary Autonomous Vehicle Controller

Figure 2:
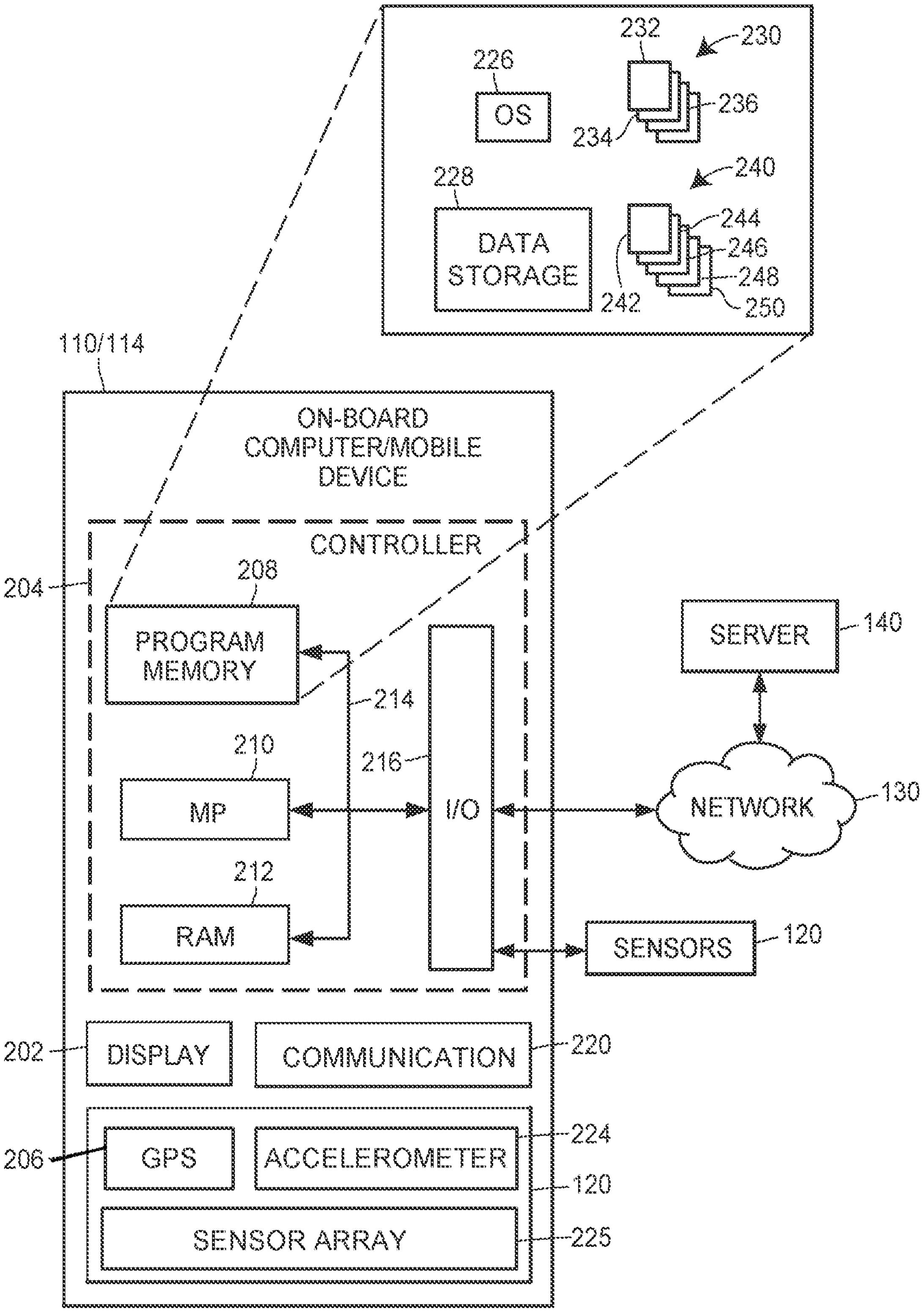
FIG. 2 illustrates a block diagram of an exemplary on-board computer or mobile device.

FIG. 2 illustrates a block diagram of an exemplary mobile device 110 or an exemplary on-board computer 114 consistent with the system 100 and the system 180. Either the mobile device 110 or on-board computer 114 may operate as a vehicle controller for autonomous vehicle seeking to rendezvous with an AVT, or a lead, rear, or other autonomous vehicle traveling in the AVT, as discussed herein.

The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the 1/0 circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below. Another of the plurality of applications 230 may be an autonomous communication application 234 that may be implemented as a series of machine-readable instructions for transmitting and receiving autonomous operation information to or from external sources via the communication module 220.

Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110 or on-board computer 114, which may be executed by the one or more processors 210 thereof.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities).

Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring method 400, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, and/or control commands sent from the on-board computer 114 to the control components (not shown) to operate the vehicle 108.

In some embodiments, control commands generated by the on-board computer 114 but not implemented may also be recorded and/or transmitted for analysis of how the autonomous operation features would have responded to conditions if the features had been controlling the relevant aspect or aspects of vehicle operation. The information may be received and stored by the server 140 implementing the autonomous operation information monitoring application 141, and the server 140 may then determine the effectiveness of autonomous operation under various conditions by implementing the feature evaluation application 142, which may include an assessment of autonomous operation features compatibility. The effectiveness of autonomous operation features and the extent of their use may be further used to determine one or more risk levels associated with operation of the autonomous vehicle by the server 140.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108.

Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Data Application

The mobile device 110 and/or on-board computer 114 may run a Data Application to collect, transmit, receive, and/or process autonomous operation feature data. Such autonomous operation feature data may include data directly generated by autonomous operation features, such as control commands used in operating the vehicle 108. Similarly, such autonomous operation feature data may include shadow control commands generated by the autonomous operation features but not actually used in operating the vehicle, such as may be generated when the autonomous operation features are disabled. The autonomous operation feature data may further include non-control data generated by the autonomous operation features, such as determinations regarding environmental conditions in the vehicle operating environment in which the vehicle 108 operates (e.g., traffic conditions, construction locations, pothole locations, worn lane markings, corners with obstructed views, etc.).

The environmental data may include data or information associated with (i) road construction; (ii) flooded roads; (iii) pot holes; (iv) debris in the road; (v) road marking visibility; (vi) presence of bicycle lanes; (vii) inoperable traffic lights; (viii) degree of road lighting from street lights; (ix) number of pedestrians nearby; (x) presence of school bus stops; (xi) presence of school zones; (xii) traffic directed by emergency personnel; (xiii) traffic accidents; (xiv) detours, and/or (xv) other anomalies.

The autonomous operation feature data may yet further include sensor data generated by (or derived from sensor data generated by) sensors 120 utilized by the autonomous operation features. For example, data from LIDAR and ultrasonic sensors may be used by vehicles for autonomous operation. Such data captures a much more detailed and complete representation of the conditions in which the vehicle 108 operates than traditional vehicle operation metrics (e.g., miles driven) or non-autonomous telematics data (e.g., acceleration, position, and time).

Autonomous operation feature data may be processed and used by the Data Application to determine information regarding the vehicle 108, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 to other vehicles (or to mobile devices 110). By communicating information associated with the autonomous operation feature data to other nearby vehicles, the other vehicles or their operators may make use of such data for routing, control, or other purposes.

This may be particularly valuable in providing detailed information regarding a vehicle environment (e.g., traffic, accidents, flooding, ice, etc.) collected by a Data Application of an autonomous vehicle 108 to a driver of a non-autonomous vehicle via a Data Application of a mobile device 110 associated with the driver. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108, via the user's mobile device 110 and/or the vehicle's on-board computer 114. The user may interact with the Data Application to locate, retrieve, park, control, or monitor the vehicle 108. For example, the Data Application may be used to select a destination and route the vehicle 108 to the destination, which may include controlling the vehicle to travel to the destination in a fully autonomous mode.

In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with vehicle operation based upon location, autonomous operation feature use (including settings), operating conditions, or other factors. Such risk assessment may be further used in recommending autonomous feature use levels, generating warnings to a vehicle operator, or adjusting an insurance policy associated with the vehicle 108.

Data Applications may be installed and running on a plurality of mobile devices 110 and/or on-board computers 114 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110 and/or onboard computer 114, which may cause the vehicle 108 to operate in accordance with the determined information (e.g., travel along a determined optimal route). Thus, the Data Application may facilitate data communication between the front-end components 102 and the back-end components 104, allowing more efficient processing and data storage.

Data Acquisition

In one aspect, the present embodiments may relate to data acquisition. Data may be gathered via devices employing wireless communication technology, such as Bluetooth or other IEEE communication standards. In one embodiment, a Bluetooth enabled smartphone or mobile device, and/or an in-dash smart and/or communications device may collect data. The data associated with the vehicle, and/or vehicle or driver performance, that is gathered or collected at, or on, the vehicle may be wirelessly transmitted to a remote processor or server, such as a remote processor or server associated with an insurance provider. The mobile device 110 may receive the data from the on-board computer 114 or the sensors 120, and may transmit the received data to the server 140 via the network 130, and the data may be stored in the database 146. In some embodiments, the transmitted data may include real-time sensor data, a summary of the sensor data, processed sensor data, operating data, environmental data, communication data, or a log such data.

Data may be generated by autonomous or semi-autonomous vehicles and/or vehicle mounted sensors (or smart sensors), and then collected by vehicle mounted equipment or processors, including Bluetooth devices, and/or an insurance provider remote processor or server. The data gathered may be used to analyze vehicle decision making. A processor may be configured to generate data on what an autonomous or semi-autonomous vehicle would have done in a given situation had the driver not taken over manual control/driving of the vehicle or alternative control actions not taken by the autonomous or semi-autonomous operation features. This type of unimplemented control decision data (related to vehicle decision making) may be useful with respect to analyzing hypothetical situations.

In one embodiment, an application (i.e., the Data Application), or other computer or processor instructions, may interact with a vehicle to receive and/or retrieve data from autonomous or semi-autonomous processors and sensors 120. The data retrieved may be related to radar, cameras, sensor output, computer instructions, or application output. The data may be telematics data, in one embodiment. Other data related to a smart vehicle controller, car navigation unit information (including route history information and typical routes taken), GPS unit information, odometer and/or speedometer information, and smart equipment data may also be gathered or collected. The application and/or other computer instructions may be associated with an insurance provider remote processor or server.

The control decision data may further include information regarding control decisions generated by one or more autonomous operation features within the vehicle. The operating data and control decision data gathered, collected, and/or acquired may facilitate remote evaluation and/or analysis of what the autonomous or semi-autonomous vehicle was "trying to do" (brake, slow, turn, accelerate, etc.) during operation, as well as what the vehicle actually did do.

In addition to control decision data, other information regarding the vehicle, the vehicle environment, or vehicle operation may be collected, generated, transmitted, received, requested, stored, or recorded in connection with the control decision data. As discussed elsewhere herein, additional operating data including sensor data from the sensors 120, autonomous communication data from the communication component 122 or the communication module 220, location data, environmental data, time data, settings data, configuration data, and/or other relevant data may be associated with the control decision data. In some embodiments, a database or log may store the control decision data and associated information. In further embodiments, the entries in such log or database may include a timestamp indicating the date, time, location, vehicle environment, vehicle condition, autonomous operation feature settings, and/or autonomous operation feature configuration information associated with each entry. Such data may facilitate evaluating the autonomous or semi-autonomous technology, functionality, system, and/or equipment in hypothetical situations and/or may be used to calculate risk, and in turn adjust insurance policies, premiums, discounts, etc.

The data gathered may be used to evaluate risk associated with the autonomous or semi-autonomous operation feature or technology at issue. As discussed elsewhere herein, information regarding the operation of the vehicle may be monitored or associated with test data or actual loss data regarding losses associated with insurance policies for other vehicles having the autonomous technology or feature to determine risk levels and/or risk profiles. Specifically, the control decision data, sensor data, and other operating data discussed above may be used to determine risk levels, loss models, and/or risk profiles associated with one or more autonomous or semi-autonomous operation features. External data may further be used to determine risk, as discussed below. Such determined risk levels may further be used to determine insurance rates, premiums, discounts, or costs as discussed in greater detail below.

In one embodiment, the data gathered may be used to determine an average distance to another vehicle ahead of, and/or behind, the vehicle during normal use of the autonomous or semi-autonomous vehicle technology, functionality, system, and/or equipment. A safe driving distance to other vehicles on the road may lower the risk of accident.

The data gathered may also relate to how quickly the technology, functionality, system, and/or equipment may properly stop or slow a vehicle in response to a light changing from green to yellow, and/or from yellow to red. Timely stopping at traffic lights may also positively impact risk of collision. The data gathered may indicate issues not entirely related to the autonomous or semi-autonomous technology, functionality, system, and/or equipment. For instance, tires spinning and low vehicle speed may be monitored and identified to determine that vehicle movement was being affected by the weather (as compared to the technology, functionality, system, and/or equipment during normal operation). Vehicle tires may spin with little or no vehicle movement in snow, rain, mud, ice, etc.

The data gathered may indicate a current version of artificial intelligence or computer instructions that the autonomous or semi-autonomous system or equipment is utilizing. A collision risk factor may be assigned to each version of computer instructions. The insurance provider may then adjust or update insurance policies, premiums, rates, discounts, and/or other insurance-related items based upon the collision risk factor and/or the artificial intelligence or computer instruction versions presently employed by the vehicle (and/or upgrades there to).

The decision and operating data gathered may be merged with outside data, such as information related to weather, traffic, construction, and/or other factors, and/or collected from sources besides the vehicle. In some embodiments, such data from outside the vehicle may be combined with the control decision data and other operating data discussed above to determine risks associated with the operation of one or more autonomous or semi-autonomous operation features.

External data regarding the vehicle environment may be requested or received via the network 130 and associated with the entries in the log or database based on the timestamp. For example, the location, date, and time of a timestamp may be used to determine weather and traffic conditions in which vehicle operation occurred. Additional external data may include road conditions, weather conditions, nearby traffic conditions, type of road, construction conditions, presence of pedestrians, presence of other obstacles, and/or availability of autonomous communications from external sources.

For instance, weather may impact certain autonomous or semi-autonomous technology, functionality, system, and/or equipment performance, such as fog, visibility, wind, rain, snow, and/or ice. Certain autonomous or semi-autonomous functionality may have degraded performance: (1) on ice covered roads; (2) during snow or rain, and/or on snow or rain covered roads; (3) during poor visibility conditions, such as foggy weather; (4) in "stop and go" traffic, such as during rush hour traffic, or slow moving traffic through high construction areas or downtown areas; and/or (5) caused by other factors.

The system and method may consider the geographical area associated with the user, or the owner or operator of a vehicle. For instance, rain mitigation functionality or technology for vehicles may be pertinent to reducing the amount of accidents and/or the severity of such accidents in areas of high rain fall, such as the Pacific Northwest or Florida. On the other hand, such functionality may have less of a beneficial impact on accidents or potential accidents in desert locations, such as Nevada or New Mexico. Construction-related data may also be collected and analyzed. Construction-related accident avoidance and/or mitigation technology, functionality, systems, or associated equipment may be more pertinent in large urban areas involving significant and lengthy construction or road connector projects that may include frequently changing travel patterns with little notice to drivers.

The data gathered may relate to autonomous vehicle telematics variables. Usage of other technologies and functionalities (including the technologies and functionalities discussed elsewhere herein) may be monitored, and recommended usages thereof (and associated insurance savings) may be provided to the insured or driver for their review and/or approval. Other manners of saving money on existing auto insurance coverage may be provided to the driver via wireless communication. For instance, a percentage of time that the vehicle is in a (1) "manual" mode or operation; (2) semi-automated, semi-automatic, or "semi-autonomous" mode or operation; and/or (3) fully automated, fully automatic, or fully "autonomous" mode or operation may be determined from vehicle sensor data that is remotely collected, such as at or by an insurance provider remote processor or server.

Also, the data gathered may be used to provide feedback to the customer or insured. For instance, if the vehicle is presently traveling on the highway, a recommendation or offer may be presented to the driver, such as via wireless communication with the vehicle that indicates that if the driver places the vehicle into autonomous or semi-autonomous driving mode, the risk of collision may be reduced and/or the driver may be receive a discount, and/or lower premium on his or her auto insurance. Other manners of potential risk reductions may also be communicated to the driver or owner of the vehicle. For instance, recommendations and/or adjustments to insurance policies, premiums, rates, discounts, rewards, and/or other insurance-related items may be based upon driver characteristics or age, such as beginning or teenage drivers.

The data gathered may originate from various smart parts and/or pieces of smart equipment mounted on a vehicle, including parts configured for wired or wireless communication. For instance, a vehicle may be equipped with smart brakes; smart tail, head, or turn lights; smart tires; etc. Each piece of smart equipment may have a wired or wireless transmitter. Each piece of smart equipment may be configured to monitor its operation, and/or indicate or communicate a warning to the driver when it is not operating properly. Such smart equipment may be included within the sensors 120.

As an example, when a rear brake light is out, such as from faulty repair or from normal burn out, that fact may be detected by smart vehicle functionality and the driver may be promptly notified. As a result, the driver may be able to repair the faulty brake light before an accident caused by the faulty brake light occurs. In another embodiment, the data gathered may also indicate window wipers are not operating properly, and need to be replaced. The insurance provider may adjust or update insurance policies, premiums, rates, discounts, and/or other insurance-related items based upon the smart equipment warning functionality that may alert drivers of vehicle equipment or vehicle safety equipment (lights, brakes, etc.) that need to be replaced or repaired, and thus may reduce collision risk. In addition to addressing liability for collision risk, the technology may also reduce risk of theft. For instance, stolen vehicles may be tracked via on-board GPS units and wireless transmitters. Also, the breaking and entering, and/or hot wiring, of vehicles may be more difficult through the use of anti-hacking measures for smart vehicles or vehicles with electrical or electronic control systems. The insurance provider may adjust insurance, including usage-based insurance (UBI), premiums, rates, and/or other insurance-related items based upon the reduced risk of theft.

Exemplary Determining Risk Using Telematics Data

As described herein, telematics data may be collected and used in monitoring, controlling, evaluating, and assessing risks associated with autonomous or semi-autonomous operation of a vehicle 108. In some embodiments, the Data Application installed on the mobile computing device 110 and/or on-board computer 114 may be used to collect and transmit data regarding vehicle operation.

This data may include operating data regarding operation of the vehicle 108, autonomous operation feature settings or configurations, sensor data (including location data), data regarding the type or condition of the sensors 120, telematics data regarding vehicle regarding operation of the vehicle 108, environmental data regarding the environment in which the vehicle 108 is operating (e.g., weather, road, traffic, construction, or other conditions). Such data may be transmitted from the vehicle 108 or the mobile computing device 110 via radio links 183 (and/or via the network 130) to the server 140. The server 140 may receive the data directly or indirectly (i.e., via a wired or wireless link 183*e* to the network 130) from one or more vehicles 182 or mobile computing devices 184. Upon receiving the data, the server 140 may process the data to determine one or more risk levels associated with the vehicle 108.

In some embodiments, a plurality of risk levels associated with operation of the vehicle 108 may be determined based upon the received data, using methods similar to those discussed elsewhere herein, and a total risk level associated with the vehicle 108 may be determined based upon the plurality of risk levels. In other embodiments, the server 140 may directly determine a total risk level based upon the received data. Such risk levels may be used for vehicle navigation, vehicle control, control hand-offs between the vehicle and driver, settings adjustments, driver alerts, accident avoidance, insurance policy generation or adjustment, and/or other processes as described elsewhere herein.

In some aspects, computer-implemented methods for monitoring the use of a vehicle 108 having one or more autonomous operation features and/or adjusting an insurance policy associated with the vehicle 108 may be provided. Such methods may comprise the following, with the customer's permission or affirmative consent: (1) collecting sensor data regarding operation of the vehicle 108 from one or more sensors 120 of a mobile computing device 110 and/or otherwise disposed within the vehicle 108; (2) determining telematics data regarding operation of the vehicle 108 based upon the collected sensor data by the mobile computing device 110 and/or on-board computer 114; (3) determining feature use levels indicating usage of the one or more autonomous operation features during operation of the vehicle 108 by an on-board computer of the vehicle 114; (4) receiving the determined feature use levels from the on-board computer 114 at the mobile computing device 110; (5) transmitting information including the telematics data and the feature use levels from the mobile computing device 114 and/or a communication component 122 of the vehicle 108 to a remote server 140 via a radio link 183 or wireless communication channel; (6) receiving the telematics data and the feature use levels at one or more processors of the remote server 140; and/or (7) determining a total risk level associated with operation of the vehicle 108 based at least in part upon the received telematics data and feature use levels by one or more processors of the remote server 140. The remote server 140 may receive the information through a communication network 130 that includes both wired and wireless communication links 183.

In some embodiments, the mobile computing device 110 and/or on-board computer 114 may have a Data Application installed thereon, as described above. Such Data Application may be executed by one or more processors of the mobile computing device 110 and/or on-board computer 114 to, with the customer's permission or affirmative consent, collect the sensor data, determine the telematics data, receive the feature use levels, and transmit the information to the remote server 140. The Data Application may similarly perform or cause to be performed any other functions or operations described herein as being controlled by the mobile computing device 110 and/or on-board computer 114.

The telematics data may include data regarding one or more of the following regarding the vehicle 108: acceleration, braking, speed, heading, and/or location. The telematics data may further include information regarding one or more of the following: time of day of vehicle operation, road conditions in a vehicle environment in which the vehicle is operating, weather conditions in the vehicle environment, and/or traffic conditions in the vehicle environment. In some embodiments, the one or more sensors 120 of the mobile computing device 110 may include one or more of the following sensors disposed within the mobile computing device 110: an accelerometer array, a camera, a microphone, and/or a geolocation unit (e.g., a GPS receiver). In further embodiments, one or more of the sensors 120 may be communicatively connected to the mobile computing device 110 (such as through a wireless communication link).

The feature use levels may be received by the mobile computing device 110 from the on-board computer 114 via yet another radio link 183 between the mobile computing device 110 and the on-board computer 114, such as link 116. The feature use levels may include data indicating adjustable settings for at least one of the one or more autonomous operation features. Such adjustable settings may affect operation of the at least one of the one or more autonomous operation features in controlling an aspect of vehicle operation, as described elsewhere herein.

In some embodiments, the method may further include receiving environmental information regarding the vehicle's environment at the mobile computing device 110 and/or on-board computer 114 via another radio link 183 or wireless communication channel. Such environmental information may also be transmitted to the remote server 140 via the radio link 183 and may be used by the remote server 140 in determining the total risk level. In some embodiments, the remote server 140 may receive part or all of the environmental information through the network 130 from sources other than the mobile computing device 110 and/or on-board computer 114. Such sources may include third-party data sources, such as weather or traffic information services. The environmental data may include one or more of the following: road conditions, weather conditions, nearby traffic conditions, type of road, construction conditions, location of pedestrians, movement of pedestrians, movement of other obstacles, signs, traffic signals, or availability of autonomous communications from external sources. The environmental data may similarly include any other data regarding a vehicle environment described elsewhere herein.

In further embodiments, the method may include collecting addition telematics data and/or information regarding feature use levels at a plurality of additional mobile computing devices 184 associated with a plurality of additional vehicles 182. Such additional telematics data and/or information regarding feature use levels may be transmitted from the plurality of additional mobile computing devices 184 to the remote server 140 via a plurality of radio links 183 and receive at one or more processors of the remote server 140. The remote server 140 may further base the determination of the total risk level at least in part upon the additional telematics data and/or feature use levels.

Some embodiments of the methods described herein may include determining, adjusting, generating, rating, or otherwise performing actions necessary for creating or updating an insurance policy associated with the vehicle 108. Thus, the remote server 140 may receive a request for a quote of a premium associated with a vehicle insurance policy associated with the vehicle 108. Such request may be transmitted via the network 130 from the mobile computing device 110 or another computing device associated with an insurance customer. Alternatively, such request may be generated upon the occurrence of an event, such as the passage of time or a change in a risk level associated with operation of the vehicle 108. In some embodiments, a routine executing on the sever 140 may generate the request based upon the occurrence of an event. Upon receiving such request, the remote server 140 may determine a premium associated with the vehicle insurance policy based at least in part upon the total risk level.

An option to purchase the vehicle insurance policy (or purchase UBI for a given amount of miles) may be presented to a customer associated with the vehicle 108, or information regarding an (actual or predicted) adjustment to an insurance policy may be presented to the customer. For example, the server 140 may cause a predicted change to an insurance policy (e.g., an increase or decrease in a premium) to be presented to the vehicle operator, such as when the vehicle operator is adjusting autonomous operation feature settings. The remote server 140 may alternatively, or additionally, provide information regarding the premium, coverage levels, costs, discounts, rates, or similar information associated with the insurance policy to be presented to the customer for review and/or approval by the mobile computing device 110 or another computing device associated with the customer.

Risk Assessment

The present embodiments may relate to risk assessment and insurance premium calculation. Autonomous software data may be analyzed to measure the risks of transitioning between human and vehicle as the driver (which may vary by driving environment, e.g., transitioning on the highway, when approaching construction, when exiting the highway, when the driver becomes impaired, and when the driver becomes distracted). Accidents related to the transition of control between the driver and the vehicle may become a common cause of accidents for autonomous vehicles. An insurance provider may be able to provide users information about instances when the user resumed control too late, or disengaged too soon, in order to help users transfer control more safely and reduce the risk of future accidents. Insurance provider remote servers may also be able to notify users of instances in which they themselves or other human drivers have activated autonomous driving features in driving environments for which the technology was not intended, such as using autonomous highway driving features on narrow country roads when intended for use only on divided highways.

An assessment may be performed that compares a vehicle's autonomous capabilities against how drivers are using the features. The present embodiments may be configured to measure when an autonomous vehicle is in control, when the driver is in control, neither, or both. The times when both the driver and the vehicle have partial or joint control may also be determined and measured. These times may present higher risk, and an appropriate auto insurance premium may be higher based upon the number of instances of partial or joint control (or partial lack of control), i.e., the frequency of control transitions. Based upon how the autonomous vehicle software handles these partial or joint control situations, premiums or discounts may be adjusted accordingly based upon risk.

The present embodiments may also be associated with unit-based costs (e.g., per-mile or per-minute premiums) that may only charge for non-autonomous driving or charge a flat fee plus non-autonomous driving factor or fee. For instance, a vehicle manufacturer's policy may cover autonomous driving liability, and manual driving liability for individual customers may be covered via a personal liability policy. It is noted that a personal liability policy may have a lower premium because of commercial policy coverage. An insurance policy may be used to define autonomous driving. Autonomous vehicle data may be analyzed to determine liability for individual claims.

Data, such as sensor or system data, may include whether a customer performed required maintenance, and/or met responsibilities defined by an original equipment manufacturer (OEM). Insurance policies may state that if a loss is not covered by the OEM, the insurance provider policy will cover the loss (i.e., the insurance provider provides "gap" coverage). Also, a commercial may cover the OEM, software developer, and/or hardware developer only when vehicle is operating in autonomous mode policy (e.g., product liability). Autonomous vehicle data may be analyzed to determine liability for a claim, including whether a customer performed required maintenance, met responsibilities defined by OEM, and/or what components were involved in leading to or causing a vehicle collision.

Autonomous Vehicle Insurance

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator controls other aspects of the operation of the vehicle.

The term "autonomous vehicle" may mean a vehicle including at least one autonomous operation feature, including semi-autonomous vehicles. A "fully autonomous vehicle" may mean a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals.

Although insurance policy premiums are typically associated with an insurance policy covering a specified period of time, they may likewise be associated with other measures of a duration of an insurance policy, such as a specified distance traveled or a specified number of trips. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation), location (e.g., general areas, types of areas, or specific road segments) or duration (e.g., distance, time duration of operation, time of day, continuous operation, etc.) of autonomous operation feature use, whether recommendations for appropriate feature use or optimal routes are followed, or other information associated with the methods described herein.

In particular, compliance, noncompliance, or degree of compliance with recommendations or requirements of allowable or optimal routes (including degree of manual or autonomous operation along portions of such routes) may be used to determine discounts, surcharges, fees, premiums, etc. Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features, including fully autonomous operation feature, semi-autonomous operation features, or vehicle-to-vehicle communications. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. The artificial intelligence pricing model may be combined with traditional methods for semi-autonomous vehicle operation. Insurance pricing for fully autonomous, or driverless, vehicles may be based upon an artificial intelligence model score by excluding traditional rating factors that measure risk presented by the drivers. Evaluation of vehicle software and/or artificial intelligence may be conducted on an aggregate basis or for specific combinations of autonomous operation features and/or driving factors.

An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof.

In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The types of autonomous or semi-autonomous vehicle-related functionality or technology implemented by various autonomous operation features may include or be related to the following: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as time of day, weather conditions, traffic congestion, construction, road conditions, type of road, interaction between autonomous operation features, or other such variables that influence the risks associated with autonomous or semi-autonomous vehicle operation.

Some embodiments described herein may include automated machine learning to dynamically direct or control an AVT, determine an AVT schedule, determine one or more way points along an AVT scheduled or alternative route, control one or more vehicles within the AVT, adjust the speed or spacing between vehicles within the AVT, and/or direct or control an autonomous vehicle seeking to rendezvous with, and join, the AVT, either in en-route or while stationery, such as at a recharging or refueling station.

Other embodiments described herein may include automated machine learning to determine risk levels, identify relevant risk factors, optimize autonomous or semi-autonomous operation, optimize routes, determine autonomous operation feature effectiveness, predict user demand for a vehicle, determine vehicle operator or passenger illness or injury, evaluate sensor operating status, predict sensor failure, evaluate damage to a vehicle, predict repairs to a vehicle, predict risks associated with manual vehicle operation based upon the driver and environmental conditions, recommend optimal or preferred autonomous operation feature usage, estimate risk reduction or cost savings from feature usage changes, determine when autonomous operation features should be engaged or disengaged, determine whether a driver is prepared to resume control of some or all vehicle operations, and/or determine other events, conditions, risks, or actions as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as autonomous vehicle system, feature, or sensor data, autonomous vehicle system control signal data, vehicle-mounted sensor data, mobile device sensor data, and/or telematics, image, or radar data) in order to facilitate making predictions for subsequent data (again, such as autonomous vehicle system, feature, or sensor data, autonomous vehicle system control signal data, vehicle-mounted sensor data, mobile device sensor data, and/or telematics, image, or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or control signal data, and other data discuss herein. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by the autonomous systems or sensors, and under what conditions those control signals were generated by the autonomous systems or sensors.

The machine learning programs may be trained with autonomous system data, autonomous sensor data, and/or vehicle-mounted or mobile device sensor data to identify actions taken by the autonomous vehicle before, during, and/or after vehicle collisions; identify who was behind the wheel of the vehicle (whether actively driving, or riding along as the autonomous vehicle autonomously drove); identify actions taken be the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insured parties after an insurance-related event.

The machine learning programs may be trained with autonomous system data, autonomous vehicle sensor data, and/or vehicle-mounted or mobile device sensor data to identify preferred (or recommended) and actual control signals relating to or associated with, for example, whether to apply the brakes; how quickly to apply the brakes; an amount of force or pressure to apply the brakes; how much to increase or decrease speed; how quickly to increase or decrease speed; how quickly to accelerate or decelerate; how quickly to change lanes or exit; the speed to take while traversing an exit or on ramp; at what speed to approach a stop sign or light; how quickly to come to a complete stop; and/or how quickly to accelerate from a complete stop.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data, such that the machine learning programs may be trained by inputting sample data sets or certain data into the programs, such as image, vehicle telematics, and/or intelligent home telematics data. The machine learning programs may include Bayesian program learning (BPL), voice recognition and synthesis, image or object recognition, optical character recognition, natural language processing, semantic analysis, and/or automatic reasoning. Models may be created based upon example inputs in order to make valid and reliable predictions for novel inputs.

Machine learning techniques may be used to extract the relevant personal and/or driving behavior-related information for drivers from vehicle-mounted, mobile device-mounted, and/or other sensor data, telematics data, image data, vehicle and GPS data, and/or other data. In one embodiment, a processing element may be trained by providing it with a large sample of conventional analog and/or digital, still and/or moving (i.e., video) image data, telematics data, and/or other data of drivers with known driving characteristics or driving risk profiles. Such information may include, for example, acceleration, cornering, speed, braking, and other driving characteristics and known risks associated with those characteristics.

Based upon these analyses, the processing element may learn how to identify characteristics and patterns that may then be applied to analyzing sensor data, telematics data, image data, vehicle data, autonomous system data, GPS data, and/or other data of new drivers or insurance applicants. For example, the processing element may learn to determine the applicant's driving risk profile from telematics and image data of applicant's driving behavior, may learn to identify low risk or risk averse driving behavior by the applicant through vehicle operation, and/or may learn to determine such other information as the applicant's typical area of travel. In another embodiment, a processing element may be trained by providing it with a large sample of conventional analog and/or digital, still and/or moving (i.e., video) image data, and/or other data of roads with known defects/obstacles or of known obstacles. The road defects/obstacles may be include pot holes, detours, construction, pedestrians, parked vehicles, congestion, traffic, and the known obstacles may include pedestrians, vehicles, construction crews, animals (deer, moose, boars, etc.).

After training, machine learning programs (or information generated by such machine learning programs) may be used to evaluate additional data. Such data may be related to tests of new autonomous operation feature or versions thereof, actual operation of an autonomous vehicle, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, thus, be used to perform part or all of the analytical functions of the methods described elsewhere herein.

Exemplary AVT Functionality

Figure 3:
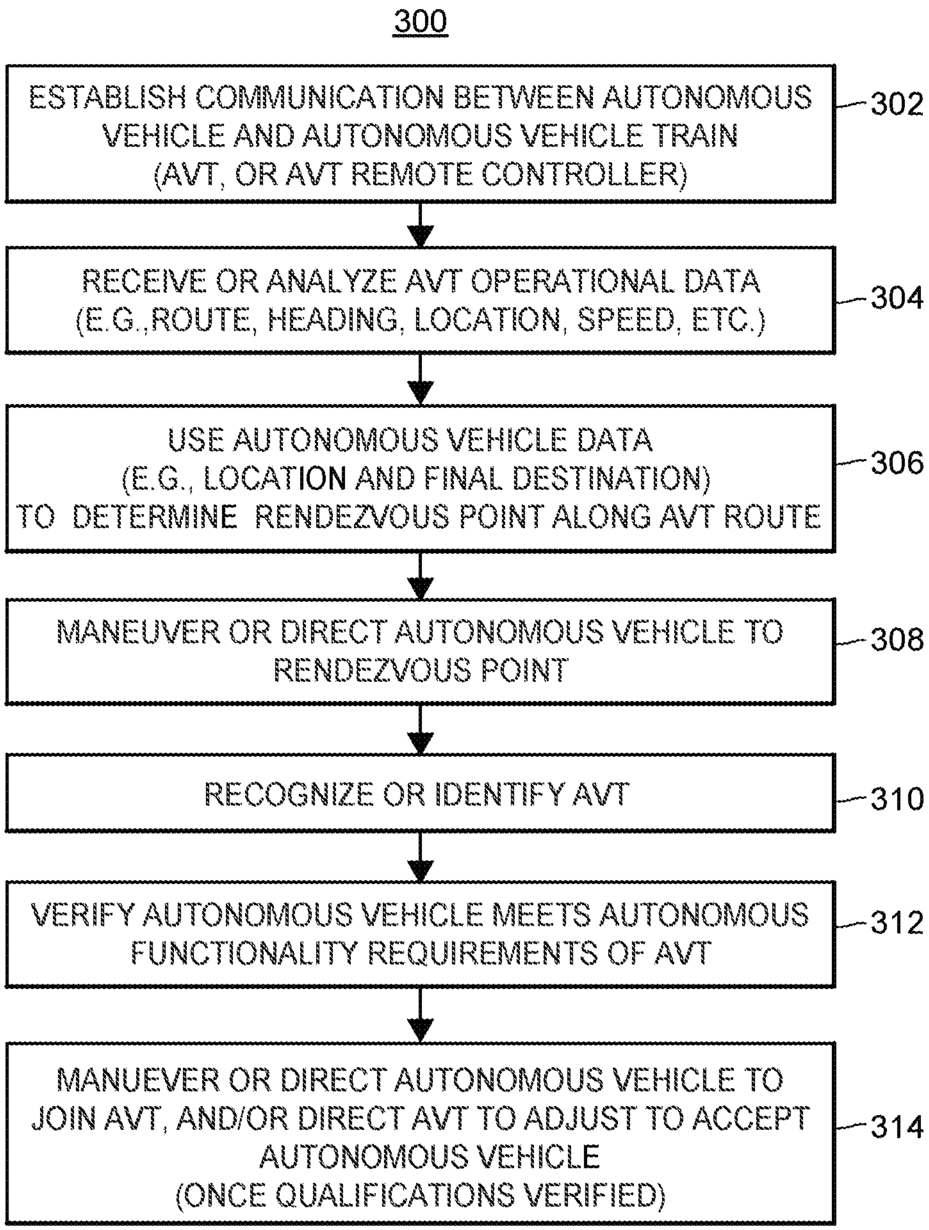
FIG. 3 illustrates a computer-implemented method for directing or controlling an autonomous vehicle to dynamically rendezvous with, and/or join, an autonomous vehicle train.

FIG. 3 illustrates a computer-implemented method 300 for directing or controlling an autonomous vehicle to dynamically rendezvous with, and/or join, an autonomous vehicle train. The method 300 may include, preferably via one or more processors, servers, sensors, and/or transceivers mounted on an autonomous vehicle, (1) establishing wireless communication with an AVT or an AVT controller 302; (2) receiving and/or analyzing AVT operational data (such as route, location, and speed information) 304; (3) comparing the AVT operation data with autonomous vehicle data (such as route, destination, location, and speed information) to determine a rendezvous point along the AVT route 306; (4) maneuvering or directing the autonomous vehicle to the rendezvous point 308; (5) recognizing or identifying the AVT 310 (such as by using lead or rear vehicle make, model, color, and/or license plate information); (6) verifying that the autonomous vehicle meets minimum requirements for the AVT 312; and/or (7) maneuvering or directing the autonomous vehicle to join the AVT, and/or directing the AVT to adjust spacing between vehicles to accept the autonomous vehicle in the middle of the AVT 314. The method may include additional, less, or alternate actions, including those discussed elsewhere herein. The actions may be performed locally or remotely, such as via one or processors, sensors, or transceivers, located on the autonomous vehicle seeking to join the AVT, on one or more vehicles of the AVT (e.g., the lead vehicle), at one or more remote servers, and/or on smart infrastructure.

Figure 4:
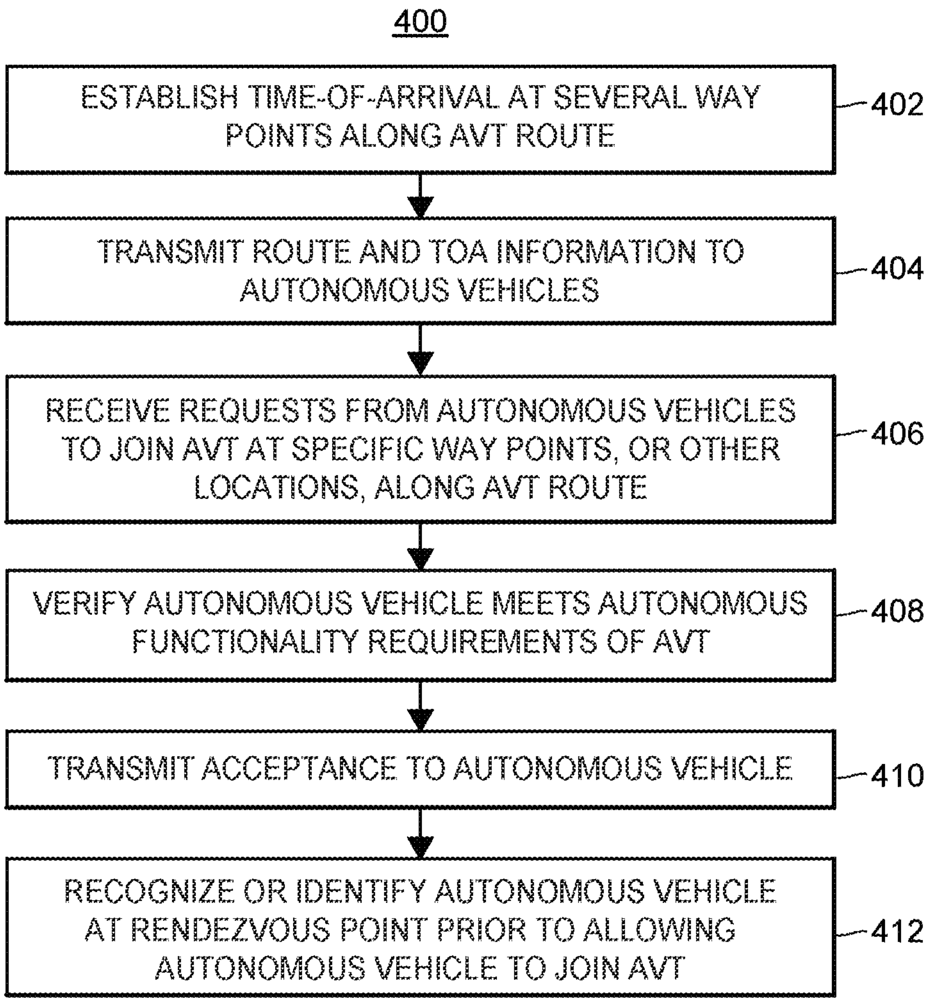
FIG. 4 illustrates a computer-implemented method for directing or controlling an autonomous vehicle train to dynamically rendezvous with, and/or accept, an autonomous vehicle.

FIG. 4 illustrates a computer-implemented method 400 for directing or controlling an autonomous vehicle train to dynamically rendezvous with, and/or accept, an autonomous vehicle. The method 400 may include, preferably via one or more processors, sensors, and/or transceivers mounted on one or more vehicles of an AVT, (1) establishing time-of-arrival (TOA) at several way points along an AVT route 402; (2) transmitting the route and/or TOA information to one or more autonomous vehicles 404; (3) receiving wireless requests from one or more autonomous vehicles to join the AVT at specific way points, or other locations, along the AVT route 406; (4) verifying an autonomous vehicle meets autonomous vehicle functionality requirements for the AVT 408; (5) transmitting acceptance to the autonomous vehicle 410; and/or (6) recognizing or identifying the autonomous vehicle at the rendezvous point prior to allowing the autonomous vehicle join the AVT 412.

The methods may include additional, less, or alternate actions, including those discussed elsewhere herein. The actions may be performed locally or remotely, such as via one or processors, sensors, or transceivers, located on the autonomous vehicle seeking to join the AVT, on one or more vehicles of the AVT (e.g., the lead vehicle), at one or more remote servers, and/or on smart infrastructure.

Dynamically Rendezvous with AVT

In one aspect, a computer-implemented method for an autonomous vehicle to dynamically rendezvous with, and/or join, an autonomous vehicle train en-route or moving may be provided. The method may include (1) establishing, via one or more processors and/or associated transceivers of an autonomous vehicle, communication (either directly or indirectly) with a lead vehicle of an Autonomous Vehicle Train (AVT) (such as via wireless communication or data transmission over one or more radio frequency links or communication channels); (2) receiving, via the one or more processors and/or associated transceivers of the autonomous vehicle (such as via wireless communication or data transmission over one or more radio frequency links or communication channels), information detailing AVT operation (AVT operational data); (3) determining, via the one or more processors of the autonomous vehicle, a rendezvous point or location (or way point) to meet and/or join the AVT based upon (i) the AVT operational data; and/or (ii) autonomous vehicle operational data; and/or (4) automatically maneuvering, via the one or more processors of the autonomous vehicle, the autonomous vehicle to the rendezvous point to facilitate the autonomous vehicle dynamically joining the AVT while the AVT remains moving and is en-route toward a destination of the autonomous vehicle. The method may include additional, less, or alternate actions, including those discussed elsewhere herein.

For instance, the AVT operational data may include AVT route, AVT heading, AVT speed, AVT current GPS location, AVT next or final destination, and/or arrival times of the AVT at one or more geographical locations or way points along a route; and/or the autonomous vehicle operational data may include the current route, heading, GPS location, speed, and ultimate destination of the autonomous vehicle.

The method may also include (a) receiving, via the one or more processors and/or associated transceivers of the autonomous vehicle (such as via wireless communication or data transmission over one or more radio frequency links or communication channels), identifying information of the lead vehicle of the AVT; and/or (b) recognizing, via the one or more processors, transceivers, and/or vehicle-mounted sensors or cameras of the autonomous vehicle, the lead, rear, or other vehicle of the AVT once the AVT is in the vicinity, or in the proximity, of the autonomous vehicle (such as within 100 yards, 100 feet, sensor or camera distance, etc.).

The method may include automatically maneuvering, via the one or more processors of the autonomous vehicle, the autonomous vehicle to join, or rendezvous with, the AVT once the lead, rear, or other vehicle of the AVT has been identified and/or verified (such as visually identified and/or verified via one or more autonomous vehicle cameras or sensors). Additionally and alternatively, the method may include automatically maneuvering, via the one or more processors of the autonomous vehicle, the autonomous vehicle to the join, or rendezvous with, the AVT at a specific spot or slot in the AVT once the lead, rear, or other vehicle of the AVT has been identified and/or verified. The identifying information of the lead, rear, or other vehicle of the AVT may include make, model, color, and/or license plate information.

For instance, the autonomous vehicle may take a photo of a lead or rear of the AVT via a vehicle-mounted camera. Object recognition or optical character recognition techniques may be used on the image to identify make and model, color, and/or license plate number. Alternatively, the AVT and autonomous vehicle may identify one another using encrypted keys, secretes, or challenges embedded within wireless communication to/from one another.

The method may include verifying, via the one or more processors of the autonomous vehicle, that the autonomous vehicle meets a minimum autonomous functionality or is equipped with one or more autonomous vehicle features, systems, or technology required to join or travel with the AVT.

In another aspect, a computer-implemented method for dynamically directing an autonomous vehicle to rendezvous with, and/or ultimately join, an autonomous vehicle train en-route may be provided. The method may include (1) establishing, via one or more processors and/or associated transceivers of an autonomous vehicle, communication (either directly or indirectly) with a lead, rear, or other vehicle of an autonomous vehicle train (AVT) (such as via wireless communication or data transmission over one or more radio frequency links or communication channels); (2) receiving, via the one or more processors and/or associated transceivers of the autonomous vehicle (such as via wireless communication or data transmission over one or more radio frequency links or communication channels), information detailing the AVT route, AVT heading, AVT speed, AVT current GPS location, AVT next or final destination, and/or arrival times of the AVT at one or more geographical locations; (3) determining, via the one or more processors of the autonomous vehicle, a rendezvous point or location to meet and/or join the AVT based upon (i) the AVT route, AVT heading, AVT speed, AVT current GPS location, AVT destination, and/or arrival times of the AVT, and/or (ii) the current route, heading, GPS location, speed, and destination of the autonomous vehicle; and/or (4) automatically maneuvering, via the one or more processors of the autonomous vehicle, the autonomous vehicle to the rendezvous point to facilitate the autonomous vehicle dynamically joining the AVT while the AVT remains moving and is en-route toward a destination of the autonomous vehicle. Alternatively, the method may involve directing the autonomous vehicle to a way point of the AVT route, and/or joining the AVT while the AVT is stationery, such as during a refueling stop. The method may include additional, less, or alternate actions, including those discussed elsewhere herein.

In another aspect, a computer system of an autonomous vehicle configured to dynamically direct an autonomous vehicle to rendezvous with, and/or join an autonomous vehicle train en-route, and/or dynamically locally or remotely control an autonomous vehicle or autonomous vehicle train may be provided. The system may include one or more processors, servers, transceivers, and/or sensors (including vehicle-mounted cameras) configured to: (1) establish communication (either directly or indirectly) with a lead, rear, or other vehicle of an autonomous vehicle train (AVT) (such as via wireless communication or data transmission over one or more radio frequency links or communication channels); (2) receive (such as via wireless communication or data transmission over one or more radio frequency links or communication channels) information detailing AVT operation (AVT operational data), such as from a lead, rear, or other vehicle of the AVT or a remote controller or remote server (or smart infrastructure); (3) determine a rendezvous point or location to meet and/or join the AVT based upon (i) the AVT operational data; and/or (ii) autonomous vehicle operational data (as determined locally by the autonomous vehicle or autonomous vehicle controller); and/or (4) automatically maneuver the autonomous vehicle to the rendezvous point (such as a way point along the route of the AVT) to facilitate the autonomous vehicle dynamically joining the AVT while the AVT remains moving and is en-route toward a destination of the autonomous vehicle. The system may be configured with additional, less, or alternate functionality, including that discussed elsewhere herein.

For instance, the AVT operational data may include AVT route, AVT heading, AVT speed, AVT current GPS location, AVT next or final destination, and/or arrival times of the AVT at one or more geographical locations, or way points along a route; and/or the autonomous vehicle operational data may include the current route, heading, GPS location, speed, and destination of the autonomous vehicle.

The system may also be configured to: (1) receive identifying information of the lead, rear, or other vehicle of the AVT; and/or (2) recognize the lead, rear, or other vehicle of the AVT once the AVT is in the vicinity or in the proximity of the autonomous vehicle (such as within a 100 yards, 100 feet, sensor or camera distance, etc.). For instance, object recognition or optical character recognition techniques may be provided on images taken by on-board sensors/cameras to identify one or more vehicles in the AVT. Additionally or alternatively, secure wireless communication and/or encryption techniques may be used for the AVT and autonomous vehicle to securely identify each other, such as once within predetermined range, such as 100 yards, 100 feet, etc.

The system may also be configured to automatically maneuver the autonomous vehicle to join, or rendezvous with, the AVT once the lead, rear, or other vehicle of the AVT has been identified and/or verified (such as visually identified and/or verified via one or more autonomous vehicle cameras or sensors, or digitally verified via wireless, encrypted communication). Additionally or alternatively, the computer system may be configured to automatically maneuver the autonomous vehicle to the join, or rendezvous with, the AVT at a specific spot or slot in the AVT once the lead, rear, or other vehicle of the AVT has been identified and/or verified. The identifying information of the lead, rear, or other vehicle of the AVT may include make, model, color, and/or license plate information, or digital information including passwords, challenges, secrets, public/private keys, vehicle identification numbers, etc.

The system may be configured to verify that the autonomous vehicle meets a minimum autonomous functionality, or is equipped with one or more autonomous vehicle features, systems, or technology required to join or travel with the AVT.

In another aspect, a computer system configured to direct an autonomous vehicle to join, or rendezvous with, an autonomous vehicle train en-route and/or otherwise dynamically direct, control, or route the autonomous vehicle may be provided. The system may include one or more processors, servers, transceivers, and/or sensors (including cameras) configured to (1) establish communication (either directly or indirectly) with a lead, rear, or other vehicle of an autonomous vehicle train (AVT) (such as via wireless communication or data transmission over one or more radio frequency links or communication channels); (2) receive (such as via wireless communication or data transmission over one or more radio frequency links or communication channels) information detailing the AVT route, AVT heading, AVT speed, AVT current GPS location, AVT next or final destination, and/or arrival times of the AVT at one or more geographical locations, or way points along an AVT route; (3) determine a rendezvous point or location (e.g., way point) to meet and/or join the AVT based upon (i) the AVT route, AVT heading, AVT speed, AVT current GPS location, AVT destination, and/or arrival times of the AVT, and/or (ii) the current route, heading, GPS location, speed, and destination of the autonomous vehicle; and/or (4) automatically maneuver or otherwise direct the autonomous vehicle to the rendezvous point to facilitate the autonomous vehicle dynamically joining the AVT while the AVT remains moving and is en-route toward a destination of the autonomous vehicle. The system may include additional, less, or alternate functionality, including that discussed elsewhere herein.

For instance, the computer system, and/or one or more processors, transceivers, servers, and/or sensors may be mounted on the autonomous vehicle seeking to join, or rendezvous with, the AVT. Additionally or alternatively, the computer system, and/or one or more processors, transceivers, servers, and/or sensors may be mounted locally on the autonomous vehicle seeking to join, or rendezvous with, the AVT, and/or remotely located, such as mounted on the lead vehicle, or associated with a remote server and/or smart infrastructure. In some embodiments, the autonomous vehicle may be directed to rendezvous with the AVT while the AVT is stationery, such as at a re-fueling stop.

Dynamically Recognizing Travelling AVT

In one aspect, a computer-implemented method of allowing an autonomous vehicle to join, rendezvous with, recognize, and/or travel with an autonomous vehicle train (AVT) may be provided. The method may include (1) establishing, via one or more processors and/or associated transceivers of an autonomous vehicle (such as via wireless communication or data transmission over one or more radio frequency links or communication channels), communication, either directly or indirectly, with a lead, rear, or other vehicle of the AVT; (2) receiving, via the one or more processors and/or associated transceivers of the autonomous vehicle (such as via wireless communication or data transmission over one or more radio frequency links or communication channels), identifying vehicle information of the lead, rear, or other vehicle of the AVT (and/or other vehicles currently in the AVT); (3) receiving, via the one or more processors and/or associated transceivers of the autonomous vehicle (such as via wireless communication or data transmission over one or more radio frequency links or communication channels), travel information of the AVT; (4) determining, via the one or more processors of the autonomous vehicle, a location (e.g., a way point along a route) to rendezvous with, and/or join, the AVT; (5) recognizing, via the one or more processors, associated transceivers, and/or vehicle-mounted sensors of the autonomous vehicle, the lead vehicle of the AVT (or another vehicle or vehicles of the AVT); and/or (6) maneuvering or otherwise directing or controlling, via the one or more processors, the autonomous vehicle to join the AVT at the location or rendezvous point to facilitate the autonomous vehicle joining, rendezvousing with, and/or traveling in conjunction with the AVT to a mid or final destination of either the AVT or the autonomous vehicle. The method may include additional, less, or alternate actions, including those discussed elsewhere herein.

For instance, determining a location for the autonomous vehicle to rendezvous with and/or join the AVT may be based upon AVT location, heading, speed, destination, and/or route information. Additionally or alternatively, determining a location for the autonomous vehicle to rendezvous with, and/or join, the AVT may be based upon autonomous vehicle location, heading, speed, destination, and/or route information.

The rendezvous point may a predetermined way point along an AVT route, or alternatively, any point along an AVT route determined based upon processor analysis of the factors discussed herein, such as current AVT location and route information, and/or current autonomous vehicle location and route information. The AVT route may have fixed starting and destination points, with several dynamic or static way points along the AVT route.

Determining a location for the autonomous vehicle to rendezvous with and/or join the AVT may, additionally or alternatively, be based upon current or predicted road conditions, traffic conditions, construction, and/or environmental or weather conditions. Additionally or alternatively, determining a location to rendezvous with and/or join the AVT may be based upon autonomous vehicle features, systems, or technologies of the AVT and/or the autonomous vehicle.

The lead vehicle identifying information may include make, model, color, and/or license plate information. Additionally, identifying information of the lead and/or other vehicles in the AVT may include make, model, color, and/or license plate information.

The method may include automatically maneuvering or otherwise controlling, via the one or more processors of the autonomous vehicle, the autonomous vehicle to join, or rendezvous with, the AVT once the lead or rear vehicle of the AVT, or one or more vehicles in the AVT, have been identified and/or verified (such as visually identified and/or verified via one or more autonomous vehicle cameras or sensors). Additionally or alternatively, the method may include automatically maneuvering or controlling, via the one or more processors of the autonomous vehicle, the autonomous vehicle (and/or the lead or other vehicles and/or AVT) to the join, or rendezvous with, the AVT at a specific spot or slot in the AVT once the lead, rear, or other vehicle of the AVT has been identified and/or verified.

The method may include verifying, via the one or more processors of the autonomous vehicle, that the autonomous vehicle meets a minimum autonomous functionality, or is equipped with one or more autonomous vehicle features, systems, or technology required to join, or travel with, the AVT.

In another aspect, a computer system configured to dynamically direct, control, or allow an autonomous vehicle to join, rendezvous with, and/or travel with an Autonomous Vehicle Train (AVT) may be provided. The system may include one or more processors, servers, transceivers, and/or sensors (including cameras) configured to: (1) establish (such as via wireless communication or data transmission over one or more radio frequency links or communication channels) communication, either directly or indirectly, with a lead, rear, or other vehicle of the AVT; (2) receive (such as via wireless communication or data transmission over one or more radio frequency links or communication channels), identifying vehicle information of the lead, rear, or other vehicle of the AVT (and/or other vehicles currently in the AVT); (3) receive (such as via wireless communication or data transmission over one or more radio frequency links or communication channels), travel or route information of the AVT; (4) determine a location for the autonomous vehicle to rendezvous with, and/or join, the AVT; (5) recognize the lead, rear, or other vehicle of the AVT; and/or (6) automatically maneuver or direct the autonomous vehicle to join, or rendezvous with, the AVT to facilitate the autonomous vehicle joining, rendezvousing with, and/or traveling in conjunction with the AVT to a mid or final destination of either the AVT or the autonomous vehicle. The system may include additional, less, or alternative functionality, including that discussed elsewhere herein.

For instance, the autonomous vehicle and/or AVT may be configured to direct the autonomous vehicle to rendezvous with the AVT while both are moving or en-route. Additionally or alternatively, the autonomous vehicle and/or AVT may be configured to direct the autonomous vehicle to rendezvous with the AVT while both are stationery, such as at a refueling way point.

Determining a location for the autonomous vehicle to rendezvous with, and/or join, the AVT may be based upon, at least partially, AVT location, heading, speed, destination, and/or route information. Additionally or alternatively, determining a location to rendezvous with, and/or join, the AVT may be based upon, at least partially, autonomous vehicle location, heading, speed, destination, and/or route information. Additionally or alternatively, determining a location to rendezvous with, and/or join, the AVT may be based upon current or predicted road conditions, traffic conditions, construction, and/or environmental or weather conditions. Additionally or alternatively, determining a location to rendezvous with, and/or join, the AVT may be based upon autonomous vehicle features, systems, or technologies of the AVT and/or the autonomous vehicle.

The lead vehicle of the AVT identifying information may include make, model, color, and/or license plate information. Additionally or alternatively, the identifying information of the lead, rear, and/or other vehicles in the AVT includes make, model, color, and/or license plate information.

The system may also be configured to: automatically maneuver or direct the autonomous vehicle and/or the AVT to allow the autonomous vehicle to join, or rendezvous with, the AVT once the lead vehicle of the AVT, or one or more other vehicles in the AVT, have been identified and/or verified (such as visually identified and/or verified via one or more autonomous vehicle cameras or sensors). Additionally or alternatively, the system may also be configured to: automatically maneuver or control the autonomous vehicle (and/or lead vehicle and/or the AVT) to allow the autonomous vehicle to the join, or rendezvous with, the AVT at a specific spot or slot in the AVT once the lead, rear, or other vehicle of the AVT has been identified and/or verified.

The system may also be configured to verify that the autonomous vehicle meets a minimum autonomous functionality, and/or is equipped with one or more autonomous vehicle features, systems, or technology required to join or travel with the AVT.

The computer system, and/or one or more processors, transceivers, servers, and/or sensors may be mounted on the autonomous vehicle seeking to join, or rendezvous with, the AVT. Additionally or alternatively, the computer system, and/or one or more processors, transceivers, servers, and/or sensors may be mounted on the autonomous vehicle seeking to join, or rendezvous with, the AVT, and/or remotely located, such as mounted on the lead vehicle, other vehicle of the AVT, or associated with a remote server and/or smart infrastructure.

Lead Vehicle Operation

In one aspect, a computer-implemented method of controlling an Autonomous Vehicle Train (AVT) via a lead vehicle of the AVT may be provided. The method may include (1) estimating or determining, via one or more processors of the lead vehicle, a time-of-arrival at several way points along an AVT route; (2) generating or determining, via one or more processors of the lead vehicle, a travel schedule that includes the time-of-arrival at several way points along an AVT route; (3) transmitting, via the one or more processors and/or associated transceivers of the lead vehicle (such as via wireless communication or data transmission over one or more radio links or communication channels), the travel schedule to one or more autonomous vehicles; (4) receiving, via the one or more processors and/or associated transceivers of the lead vehicle (such as via wireless communication or data transmission over one or more radio links or communication channels), an electronic request to join the AVT at a specific location along the AVT route, or at a specific way point along the AVT route, from an autonomous vehicle; and/or (5) transmitting, via the one or more processors and/or associated transceivers of the lead vehicle (such as via wireless communication or data transmission over one or more radio links or communication channels), an electronic receipt to the autonomous vehicle to facilitate allowing the autonomous vehicle joining, or rendezvousing with, the AVT at a specific location, or a way point, along the AVT route, and enhancing the travel experience. The method may include additional, less, or alternate actions, including those discussed elsewhere herein.

For instance, the method may include (i) receiving, via the one or more processors and/or associated transceivers of the lead vehicle (such as via wireless communication or data transmission over one or more radio links or communication channels), autonomous vehicle functionality or qualifications of the autonomous vehicle; and/or (ii) verifying, via the one or more processors and/or associated transceivers of the lead vehicle, that the autonomous vehicle functionality or qualifications of the autonomous vehicle meets minimum autonomous vehicle functionality, qualifications, or requirements of the AVT prior to accepting or allowing the autonomous vehicle to join, or travel with, the AVT.

The method may include (i) transmitting, via the one or more processors and/or associated transceivers of the lead vehicle (such as via wireless communication or data transmission over one or more radio links or communication channels), autonomous vehicle functionality, qualifications, and/or requirements of the AVT to the autonomous vehicle; and/or (ii) verifying, via the one or more processors and/or associated transceivers of the lead vehicle, that the autonomous vehicle is qualified to join, or travel with, the AVT.

The method may include (i) receiving, via the one or more processors and/or associated transceivers of the lead vehicle (such as via wireless communication or data transmission over one or more radio links or communication channels), electronic financial account information associated with the autonomous vehicle; and/or (ii) debiting, via the one or more processors and/or associated transceivers of the lead vehicle, the electronic financial account information associated with the autonomous vehicle after the autonomous vehicle electronic accepts traveling with the AVT for a specific distance along the AVT route.

The method may include (i) receiving, via the one or more processors and/or associated transceivers of the lead vehicle (such as via wireless communication or data transmission over one or more radio links or communication channels), current and/or predicted weather, road, construction, and/or traffic conditions along a currently scheduled AVT route, such as from a 3$^{rd}$ party remote server or from smart infrastructure; and/or (ii) determining, via the one or more processors of the lead vehicle, an alternate AVT route based upon the current and/or predicted weather, road, construction, and/or traffic conditions to minimize the impact of the conditions on the AVT and/or to reduce risk of vehicle collision along the currently scheduled AVT route. The method may also include transmitting, via the one or more processors and/or associated transceivers of the lead vehicle (such as via wireless communication or data transmission over one or more radio links or communication channels), the alternate AVT route to one or more autonomous vehicles to facilitate the AVT traveling an alternate route associated with less risk given current or predicted conditions.

The method may include (i) generating, via one or more processors, a UBI insurance quote for the autonomous vehicle based upon an AVT selected, AVT route selected, and/or autonomous vehicle features; and/or (ii) transmitting, via one or more processors and/or transceivers, the UBI insurance quote to the autonomous vehicle, or autonomous vehicle passenger or owner, for acceptance by the autonomous vehicle, or passenger or owner.

In another aspect, a computer system of a lead vehicle may be configured to control an Autonomous Vehicle Train (AVT) via the lead vehicle of the AVT. The computer system may include one or more processors, sensors, and/or transceivers configured to: (1) estimate or determine a time-of-arrival at several way points along an AVT route; (2) generate or determine a travel schedule that includes the time-of-arrival at several way points along an AVT route; (3) transmit (such as via wireless communication or data transmission over one or more radio links or communication channels) the travel schedule to one or more autonomous vehicles; (4) receive (such as via wireless communication or data transmission over one or more radio links or communication channels) an electronic request to join the AVT at a specific location along the AVT route, or at a specific way point along the AVT route from an autonomous vehicle; and/or (5) transmit (such as via wireless communication or data transmission over one or more radio links or communication channels) an electronic receipt to the autonomous vehicle to facilitate allowing the autonomous vehicle to join or rendezvous with the AVT at a specific location, or a predetermined way point, along the AVT route, and enhancing the travel experience. The system may include additional, less, or alternate functionality, including that discussed elsewhere herein.

The system may be configured to (i) receive (such as via wireless communication or data transmission over one or more radio links or communication channels) autonomous vehicle functionality or qualifications of the autonomous vehicle; and/or (ii) verify that the autonomous vehicle functionality or qualifications of the autonomous vehicle meets minimum autonomous vehicle functionality or qualifications prior to accepting or allowing the autonomous vehicle to join, or travel with, the AVT.

The system may be configured to (i) transmit (such as via wireless communication or data transmission over one or more radio links or communication channels) autonomous vehicle functionality, qualifications, and/or requirements of the AVT to the autonomous vehicle; and/or (ii) verify that the autonomous vehicle is qualified to join or travel with the AVT.

The system may be configured to (i) receive (such as via wireless communication or data transmission over one or more radio links or communication channels) electronic financial account information associated with the autonomous vehicle; and/or (ii) debit the electronic financial account information associated with the autonomous vehicle after the autonomous vehicle electronic accepts traveling with the AVT for a specific distance along the AVT route.

The system may be configured to (i) receive (such as via wireless communication or data transmission over one or more radio links or communication channels) current and/or predicted weather, road, construction, and/or traffic conditions along a currently scheduled AVT route, such as from a 3$^{rd}$ party remote server or from smart infrastructure; and/or (ii) determine an alternate AVT route based upon the current and/or predicted weather, road, construction, and/or traffic conditions to minimize the impact of the conditions on the AVT and/or to reduce risk of vehicle collision along the currently scheduled AVT route. The system may be configured to transmit (such as via wireless communication or data transmission over one or more radio links or communication channels) the alternate AVT route to one or more autonomous vehicles to facilitate the AVT traveling an alternate route associated with less risk given current or predicted conditions.

The system may be configured to generate a UBI insurance quote for the autonomous vehicle based upon an AVT selected, AVT route selected, and/or autonomous vehicle features; and/or transmit the UBI insurance quote to the autonomous vehicle, or autonomous vehicle passenger or owner, for acceptance by the autonomous vehicle, or passenger or owner.

An UBI insurance quote may be determined for a specific autonomous vehicle or a specific driver. An UBI insurance quote, rate, or discount may be generated or determined on a number of factors, such as current or predicted road, weather, construction, travel, and traffic conditions. An UBI insurance quote, rate, or discount may additionally or alternatively be determined based upon, at least in part, telematics data associated with the driver, a passenger, and/or an autonomous vehicle, or even telematics data associated with one or more specific autonomous vehicle features.

Dynamically Adjustable AVT

In one aspect, a computer-implemented method of remotely or locally dynamically controlling or adjusting vehicles within an Autonomous Vehicle Train (AVT) may be provided. The method may include (1) adjusting, via one or more processors and/or associated transceivers, a speed of two or more autonomous vehicles in an AVT to be a same speed; (2) adjusting, via one or more processors and/or associated transceivers, a distance between two or more autonomous vehicles in an AVT, or a following distance for each autonomous vehicle in the AVT, to be a same distance; and/or (3) adjusting, via one or more processors and/or associated transceivers, a spacing and/or speed of the two or more autonomous vehicles in the AVT to facilitate the AVT accepting a new autonomous vehicle while the both the AVT and the autonomous vehicle are en-route or moving toward an intermediary or final destination. The method may include additional, less, or alternate actions, including those discussed elsewhere herein.

For instance, adjusting, via one or more processors and/or transceivers, a spacing and/or speed of the two or more autonomous vehicles in the AVT may involve making a space within the AVT between two autonomous vehicles for the autonomous vehicle to travel within, and/or directing the autonomous vehicle to join the AVT within the space created. Alternatively, adjusting, via one or more processors and/or transceivers, a spacing and/or speed of the two or more autonomous vehicles in the AVT involves directing the autonomous vehicle to join the AVT by following the rear vehicle of the AVT at a specific distance and/or specific speed.

The method may include adjusting, via one or more processors and/or associated transceivers, the distance between each autonomous vehicle in the AVT after the autonomous vehicle has joined the AVT to a desired following distance. The method may include adjusting, via one or more processors and/or associated transceivers, the speed of each autonomous vehicle in the AVT after the autonomous vehicle has joined the AVT to a desired traveling speed.

The one or more processors and/or associated transceivers may be mounted on a lead vehicle of the AVT. The one or more processors and/or associated transceivers may be mounted on the autonomous vehicle seeking to join the AVT. Additionally or alternatively, the one or more processors and/or associated transceivers may be mounted on the autonomous vehicle and/or a lead or other vehicle in the AVT, and/or associated with a remote server, and/or smart infrastructure.

The method may include verifying, via one or more processors and/or associated transceivers, autonomous vehicle functionality or capabilities of the autonomous vehicle meet the minimum qualifications or requirements of the AVT. The method may also include generating or determining, via one or more processors and/or associated transceivers, an usage-based insurance (UBI) quote for the autonomous vehicle and for traveling with the AVT based upon the autonomous vehicle functionality or capabilities of the autonomous vehicle, and/or the autonomous vehicle minimum qualifications or requirements of the AVT.

In another aspect, a computer system configured to remotely or locally dynamically control or adjust vehicles within an Autonomous Vehicle Train (AVT) may be provided. The system may include one or more processors, servers, sensors, and/or transceivers configured to: (1) adjust a speed of two or more autonomous vehicles in an AVT to be a same speed; (2) adjust a distance between two or more autonomous vehicles in an AVT, or a following distance for each autonomous vehicle in the AVT, to be a same distance; and/or (3) adjust a spacing and/or speed of the two or more autonomous vehicles in the AVT to facilitate the AVT accepting a new autonomous vehicle while the both the AVT and the autonomous vehicle are en-route or moving toward an intermediary or final destination. The system may include additional, less, or alternative functionality, including that discussed elsewhere herein.

Exemplary Autonomous Vehicle Control

Figure 5:
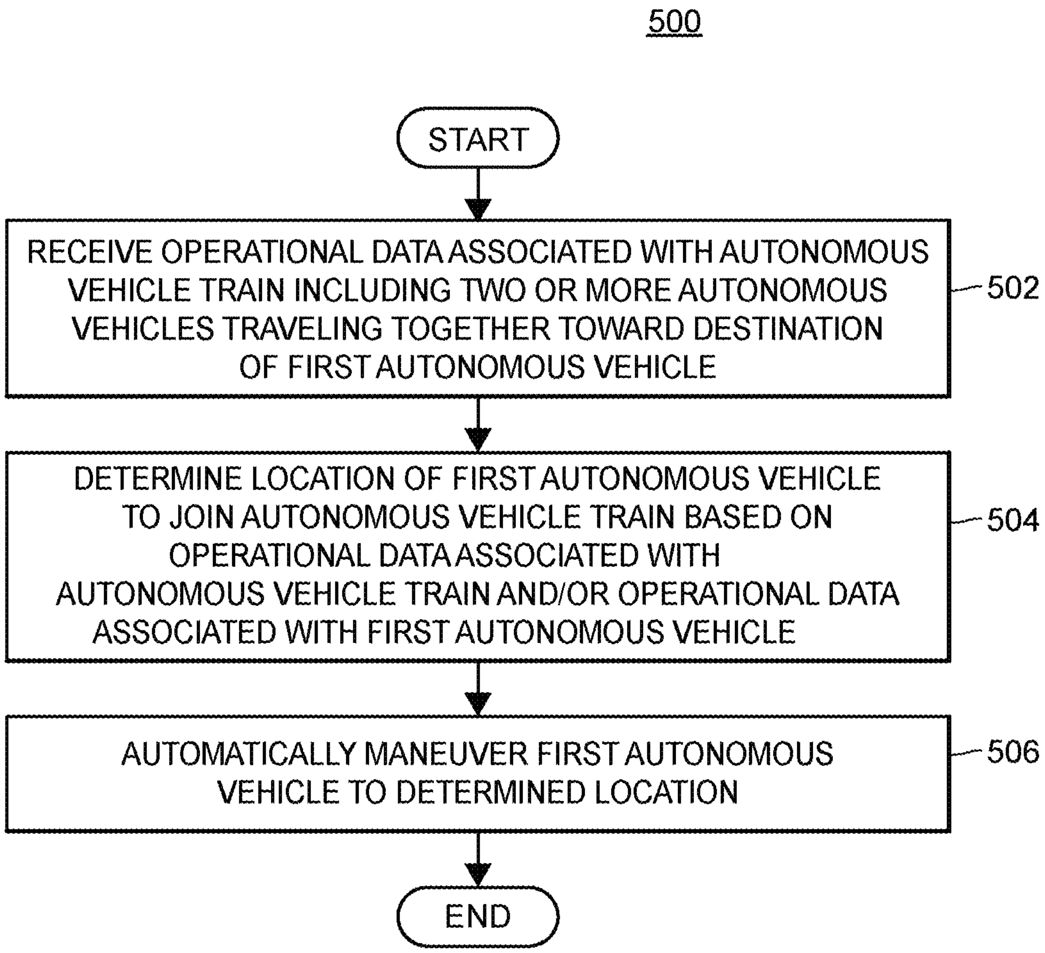
FIG. 5 illustrates a computer-implemented method for joining an autonomous vehicle to an autonomous vehicle train en-route.

FIG. 5 depicts a flow diagram of an exemplary method 500 for joining an autonomous vehicle to an autonomous vehicle train en-route. Method 500 may be facilitated by an electronic device (e.g., mobile device 110 and/or on-board computer 114) associated with the first autonomous vehicle (e.g., autonomous vehicle 108), which may support execution of a dedicated application that may facilitate the functionalities of the method 500. Further, the electronic device may enable a user to make various selections and facilitate various functionalities.

Generally speaking, the autonomous vehicle train of method 500 may include two or more autonomous vehicles traveling together, e.g., traveling consecutively on a highway. The first autonomous vehicle described in the method 500 may not be part of the autonomous vehicle train, i.e., the first autonomous vehicle may be traveling independently, or may not be traveling at all initially.

At block 502, operational data associated with an autonomous vehicle train may be received, e.g., via one or more processors and/or associated transceivers of the first autonomous vehicle. The operational data associated with the autonomous vehicle train may include, for example, route data, speed data, or GPS location data. Additionally, the operational data associated with the autonomous vehicle train may include data indicating a next or final destination of the autonomous vehicle train, or arrival time data indicating a time or a range of times at which the autonomous vehicle train will arrive at or pass by one or more geographical locations. In some instances, the operational data associated with the autonomous vehicle train may include an autonomous functionality requirement for joining the autonomous vehicle train. For example, certain features or technologies may be required for joining certain autonomous vehicle trains.

At block 504, a location for the first autonomous vehicle to join the autonomous vehicle train may be determined, e.g., via one or more processors and/or associated transceivers of the first autonomous vehicle. In particular, the location for the first autonomous vehicle to join the autonomous vehicle train may be determined based on the operational data associated with the autonomous vehicle train and/or based on operational data associated with the first autonomous vehicle.

The operational data associated with the first autonomous vehicle may include, for instance, heading data, GPS location data, and/or speed data associated with the first autonomous vehicle. Additionally, the operational data associated with the first autonomous vehicle may also include destination data indicating a destination of the first autonomous vehicle. The destination data may further indicate a time or a range of times at which the first autonomous vehicle should reach the destination. The operational data associated with the first autonomous vehicle may also include route data, e.g., related to a current route of the first autonomous vehicle prior to joining the autonomous vehicle train. Any or all of the operational data associated with the first autonomous vehicle may be obtained, e.g., via one or more processors, sensors, and/or transceivers associated with the first autonomous vehicle, or by any other suitable means.

In some instances, the operational data associated with the first autonomous vehicle may include data indicating the autonomous functionalities, features, and/or technologies of the first autonomous vehicle. In those instances, the autonomous functionalities of the first autonomous vehicle may be verified, e.g., via the one or more processors of the first autonomous vehicle, in order to determine whether the first autonomous vehicle meets or exceed the minimum autonomous functionality requirement for joining the autonomous vehicle train. In instances when the first autonomous vehicle fails to meet the autonomous functionality requirement for joining the autonomous vehicle train, the method may not proceed to block 506.

At block 506, the first autonomous vehicle may be automatically maneuvered to the determined location, e.g., via the one or more processors of the first autonomous vehicle. The location may be, for example, an on-ramp leading to a highway, or a landmark along the route of the autonomous vehicle train. Accordingly, the first autonomous vehicle may join the autonomous vehicle train at the determined location, e.g., when the autonomous vehicle train arrives at the determined location, or as the autonomous vehicle train is passing by the determined location.

In some embodiments, the method 500 may include additional or alternative steps. For example, identification information associated with a second autonomous vehicle that is part of the autonomous vehicle train may be received, e.g., via one or more processors and/or associated transceivers of the first autonomous vehicle. The identification information may include, e.g., make information, model information, color information, and/or license plate information associated with the second autonomous vehicle, or any other information suitable for identifying the second autonomous vehicle.

Subsequently, the second autonomous vehicle may be identified e.g., via one or more processors, transceivers, and/or one or more vehicle-mounted sensors or cameras of the first autonomous vehicle. The second autonomous vehicle may be, for example, a lead vehicle of the autonomous vehicle train, or a rear vehicle of the autonomous vehicle train. Of course, in various embodiments, the second autonomous vehicle may be in any position of the autonomous vehicle train.

In some instances, in response to identifying the second autonomous vehicle, the first autonomous vehicle may be automatically maneuvered to join the autonomous vehicle train, e.g., via the one or more processors of the first autonomous vehicle. For example, the first autonomous vehicle may be automatically maneuvered to join the autonomous vehicle train in a particular position within the autonomous vehicle train. For instance, the first autonomous vehicle may be automatically maneuvered to join the autonomous vehicle train in a particular position relative to the second autonomous vehicle, e.g., directly behind the second autonomous vehicle or between the second vehicle and a third vehicle, for instance.

Exemplary AVT Identification

Figure 6:
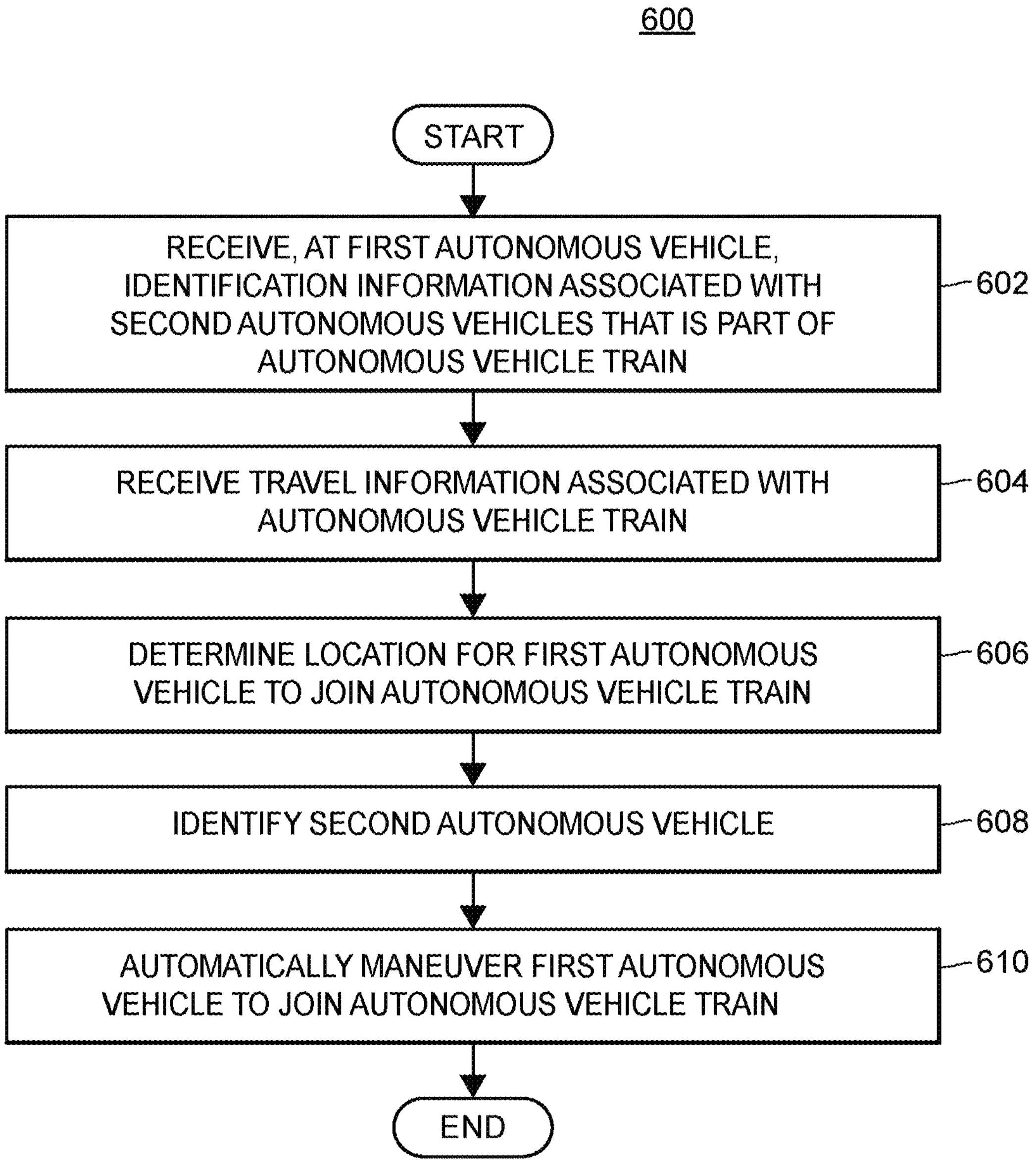
FIG. 6 illustrates a computer-implemented method of identifying an autonomous vehicle train for an autonomous vehicle to join.

FIG. 6 illustrates a computer-implemented method 600 of identifying an autonomous vehicle train for a first autonomous vehicle to join. Method 600 may be facilitated by an electronic device (e.g., mobile device 110 and/or on-board computer 114) associated with the first autonomous vehicle (e.g., autonomous vehicle 108), which may support execution of a dedicated application that may facilitate the functionalities of the method 600. Further, the electronic device may enable a user to make various selections and facilitate various functionalities.

Generally speaking, the autonomous vehicle train of method 600 may include two or more autonomous vehicles traveling together, e.g., traveling consecutively on a highway. The first autonomous vehicle described in method 600 may not be part of the autonomous vehicle train, i.e., the first autonomous vehicle may be traveling independently, or may not be traveling at all initially, while the second autonomous vehicle described in method 600 may be part of the autonomous vehicle train. In some instances, the second autonomous vehicle may be a lead vehicle of the autonomous vehicle train, while in other instances, the second autonomous vehicle may be a rear vehicle of the autonomous vehicle train, or one of many middle vehicles of the autonomous vehicle train.

At block 602, identification information associated with the second autonomous vehicle may be received, e.g., via one or more processors and/or associated transceivers of the first autonomous vehicle. The identification information associated with the second autonomous vehicle may include, for instance, make information, model information, color information, license plate information, and/or any other suitable identification information associated with the second autonomous vehicle.

At block 604, travel information associated with the autonomous vehicle train may be received, e.g., via one or more processors and/or associated transceivers of the first autonomous vehicle. The travel information may include a current or predicted location of the autonomous vehicle train, a current or predicted speed of the autonomous vehicle train, one or more destinations of the autonomous vehicle train and/or a time at which the autonomous vehicle train is estimated to reach each destination, and/or route information associated with the autonomous vehicle train (e.g., roads that the autonomous vehicle train will take to reach its destination). In some instances, the travel information may additionally include a threshold minimum autonomous functionality requirement for joining the autonomous vehicle train.

At block 606, a location for the first autonomous vehicle to join the autonomous vehicle train may be determined, e.g., via one or more processors of the first autonomous vehicle. The location for the first autonomous vehicle to join the autonomous vehicle train may be based upon various of the received travel information. For instance, the location for the first autonomous vehicle to join the autonomous vehicle train may be based upon a current or predicted location of the autonomous vehicle train, a current or predicted speed of the autonomous vehicle train, one or more destinations of the autonomous vehicle train and/or a time at which the autonomous vehicle train is estimated to reach each destination, and/or route information associated with the autonomous vehicle train (e.g., roads that the autonomous vehicle train will take to reach its destination).

Additionally or alternatively, the location for the first autonomous vehicle to join the autonomous vehicle train may be based upon, for example, a current or predicted location of the first autonomous vehicle, a current or predicted speed of the first autonomous vehicle, a destination of the first autonomous vehicle, and/or route information associated with the first autonomous vehicle.

Moreover, the location for the first autonomous vehicle to join the autonomous vehicle train may be based upon, for instance, current or predicted road conditions, traffic conditions, environmental conditions, and/or weather conditions. Additionally or alternatively, in some instances, determining a location for the first autonomous vehicle to join the autonomous vehicle train may be based upon one or more autonomous functionalities, features, and/or technologies of the autonomous vehicle train and/or autonomous functionalities, features, and/or technologies of the first autonomous vehicle.

At block 608, the second autonomous vehicle may be identified, e.g., via one or more processors, transceivers, and/or one or more vehicle-mounted sensors or cameras of the first autonomous vehicle, using the received identification information associated with the second vehicle.

In some instances, prior to proceeding to block 610, the autonomous functionalities of the first autonomous vehicle may be verified, e.g., via the one or more processors of the first autonomous vehicle, in order to determine whether the first autonomous vehicle meets or exceed the minimum autonomous functionality requirement for joining the autonomous vehicle train. In instances when the first autonomous vehicle fails to meet the autonomous functionality requirement for joining the autonomous vehicle train, the method may not proceed to block 610.

At block 610, the first autonomous vehicle may be automatically maneuvered to join the autonomous vehicle train, e.g., via one or more processors of the first autonomous vehicle. In some instances, the first autonomous vehicle may be automatically maneuvered to join the autonomous vehicle train in response to identifying the second autonomous vehicle. Additionally, in some instances, the first autonomous vehicle may be automatically maneuvered to join the autonomous vehicle train in a particular position within the autonomous vehicle train. For instance, the first autonomous vehicle may be automatically maneuvered to join the autonomous vehicle train in a particular position relative to the second autonomous vehicle, e.g., directly behind the second autonomous vehicle or between the second vehicle and a third vehicle, for instance.

Exemplary AVT Functionality

Figure 7:
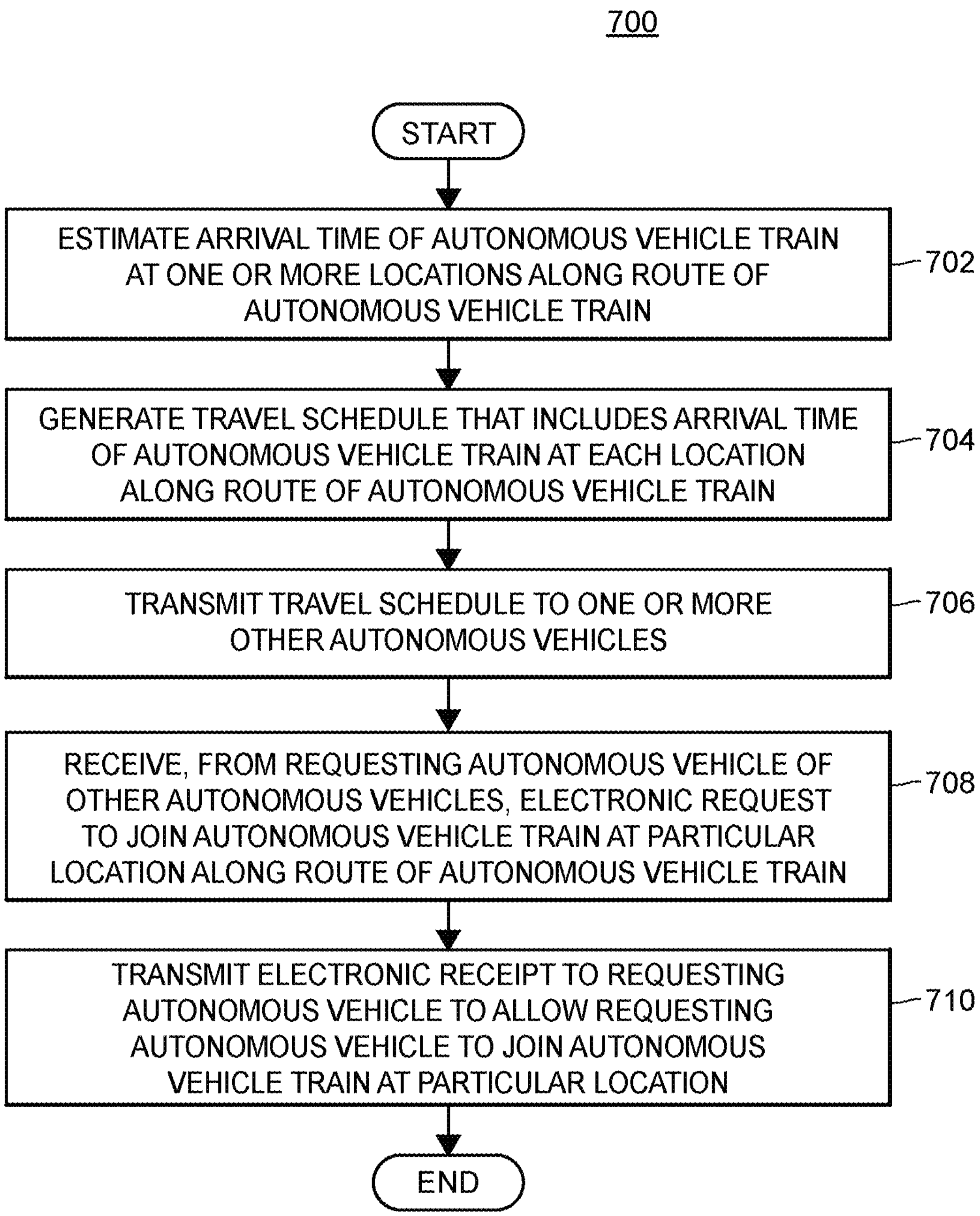
FIG. 7 illustrates a computer-implemented method of controlling an autonomous vehicle train via a lead autonomous vehicle.

FIG. 7 illustrates a computer-implemented method 700 of controlling an autonomous vehicle train via a lead autonomous vehicle. Method 700 may be facilitated by an electronic device (e.g., mobile device 110 and/or on-board computer 114) associated with the lead autonomous vehicle (e.g., autonomous vehicle 108), which may support execution of a dedicated application that may facilitate the functionalities of the method 700. Further, the electronic device may enable a user to make various selections and facilitate various functionalities.

Generally speaking, the autonomous vehicle train of method 700 may include two or more autonomous vehicles traveling together, e.g., traveling consecutively on a highway. The lead autonomous vehicle described in method 700 may be the first autonomous vehicle of the autonomous vehicle train, and the other autonomous vehicles of the autonomous vehicle train may follow the lead autonomous vehicle (or may each autonomous vehicle may follow the autonomous vehicle ahead of it in line).

At block 702, the arrival time of the autonomous vehicle train at one or more locations along the route of the autonomous vehicle train may be estimated, e.g., via one or more processors of the lead autonomous vehicle. For example, the current location of the lead vehicle may be determined via GPS, and a distance between the lead vehicle and each location may be calculated using the current location of the lead vehicle in order to estimate an arrival time.

At block 704, a travel schedule including the arrival time of the autonomous vehicle train at each of the locations may be generated, e.g., via one or more processors of the lead autonomous vehicle. At block 706, the travel schedule may be transmitted to one or more other autonomous vehicles not currently part of the autonomous vehicle train, e.g., via one or more processors or associated transceivers of the lead autonomous vehicle.

At block 708, an electronic request to join the autonomous vehicle train at a particular location may be received from a requesting autonomous vehicle, e.g., via one or more processors or associated transceivers of the lead autonomous vehicle. In some instances, the request may include information related to an electronic financial account associated with the requesting autonomous vehicle.

In some instances, an indication of the autonomous features, functionalities, and/or technologies of the requesting autonomous vehicles may also be received from the requesting autonomous vehicle, e.g., via one or more processors or associated transceivers of the lead autonomous vehicle. In such instances, prior to proceeding to block 710, an assessment may be made as to whether the indicated autonomous features, functionalities, and/or technologies of the requesting autonomous vehicle meet a threshold minimum autonomous vehicle functionality requirement for joining the autonomous vehicle train. In instances when the requesting autonomous vehicle fails to meet the threshold minimum autonomous vehicle functionality requirement for joining the autonomous vehicle train, the method may not proceed to block 710.

At block 710, an electronic receipt may be transmitted to the requesting autonomous vehicle, e.g., via one or more processors or associated transceivers of the lead autonomous vehicle, indicating that the requesting autonomous vehicle may join the autonomous vehicle train at the particular location.

In some instances, the electronic financial account associated with the requesting autonomous vehicle may be debited via the one or more processors of the lead autonomous vehicle or via the one or more transceivers of the lead autonomous vehicle, e.g., at the time that the electronic receipt is transmitted, or at the time when the requesting autonomous vehicle joins the autonomous vehicle train.

Additionally or alternatively, in some instances, an insurance quote or an insurance discount may be generated for the requesting vehicle at the time that the electronic receipt is transmitted, or at the time when the requesting autonomous vehicle joins the autonomous vehicle train e.g., via one or more processors of the lead autonomous vehicle. The insurance quote or insurance discount may be based on e.g., the particular autonomous vehicle train joined, an autonomous vehicle train route selected, and/or autonomous functionalities of the autonomous vehicle train, i.e., based on the improved safety associated with the autonomous vehicle train, and/or its route. The insurance quote and/or insurance discount may be transmitted to an electronic device associated with the requesting vehicle, and/or an electronic device associated with an owner, passenger, and/or driver of the autonomous vehicle, e.g., via one or more processors and/or associated transceivers of the lead autonomous vehicle.

In some instances, an indication of one or more conditions along a scheduled route of the autonomous vehicle train may be received, e.g., via one or more processors or associated transceivers of the lead autonomous vehicle. For example, the conditions may include current or predicted weather, road conditions, construction conditions, and/or traffic conditions along the scheduled route of the autonomous vehicle train. In such instances, an alternate autonomous vehicle train route may be determined in order to avoid the one or more conditions, e.g., via one or more processors of the lead autonomous vehicle. The alternate autonomous vehicle train route may be transmitted to the autonomous vehicles of the autonomous vehicle train, e.g., via one or more processors or associated transceivers of the lead autonomous vehicle. Accordingly, the autonomous vehicles of the autonomous vehicle train may follow the lead autonomous vehicle along the alternate autonomous train route.

Dynamically Controlling Vehicles

Figure 8:
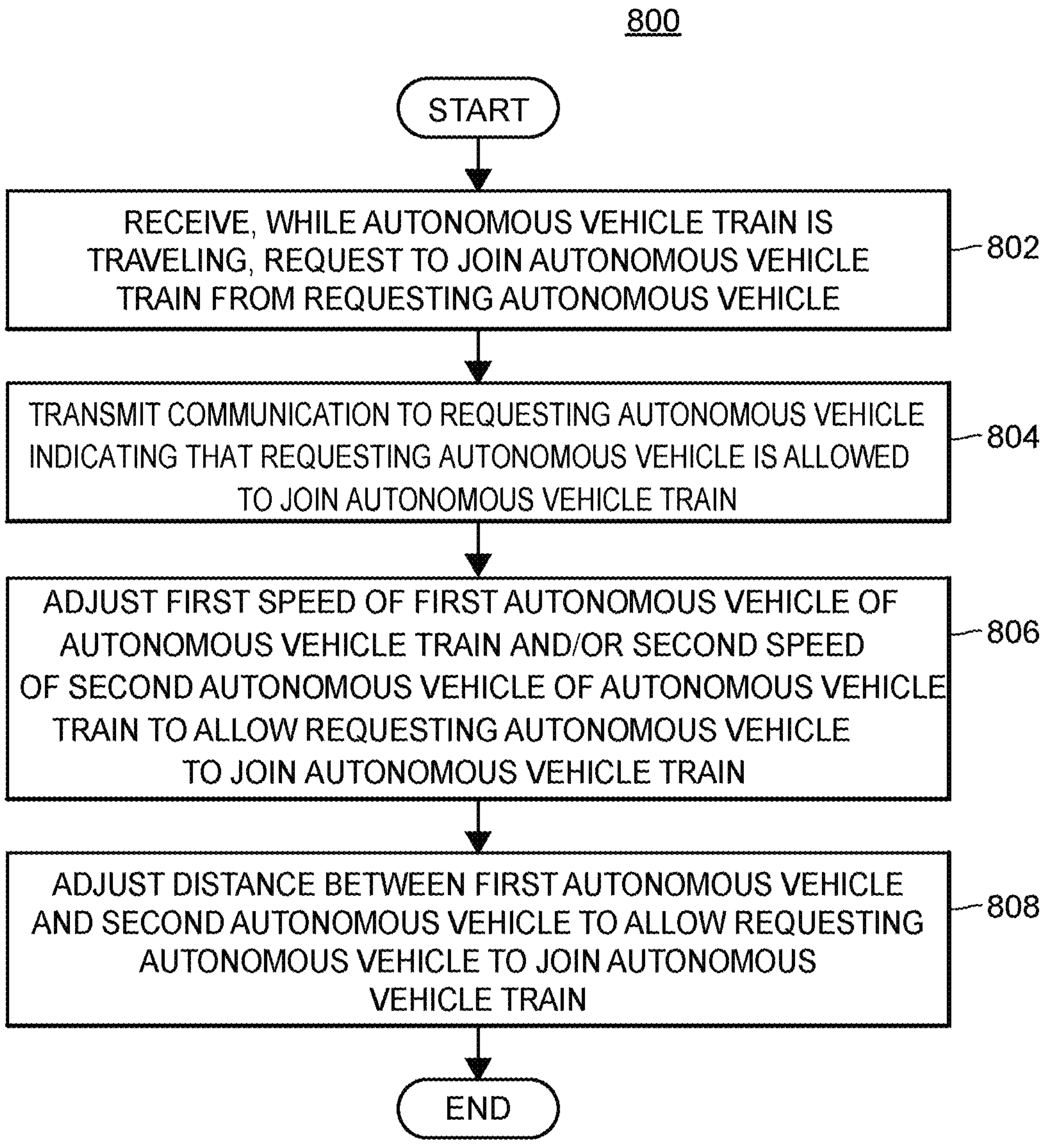
FIG. 8 illustrates a computer-implemented method of dynamically controlling vehicles within an autonomous vehicle train while the autonomous vehicle train is traveling.

FIG. 8 illustrates a computer-implemented method of dynamically controlling vehicles within an autonomous vehicle train while the autonomous vehicle train is traveling. Method 800 may be facilitated by one or more electronic devices (e.g., mobile device 110 and/or on-board computer 114) associated with one or more autonomous vehicles (e.g., autonomous vehicle 108) of an autonomous vehicle train, which may support execution of a dedicated application that may facilitate the functionalities of the method 800. Further, the electronic device may enable a user to make various selections and facilitate various functionalities. Generally speaking, the autonomous vehicle train of method 800 may include two or more autonomous vehicles traveling together, e.g., traveling consecutively on a highway, while the requesting autonomous vehicle of method 800 may not initially be part of the autonomous vehicle train initially.

At block 802, a request to join an autonomous vehicle train may be received from a requesting autonomous vehicle that is not currently part of the autonomous vehicle train, e.g., via one or more processors and/or associated transceivers of one or more autonomous vehicles of the autonomous vehicle train. In particular, the request may be received while the autonomous vehicle train is in transit, e.g., driving along the highway. In some instances the processors and/or associated transceivers may be mounted on the lead vehicle of the autonomous vehicle train. In other instances, the processors and/or associated transceivers may be mounted on another autonomous vehicle of the autonomous vehicle train, and/or multiple other autonomous vehicles of the autonomous vehicle train. In still other instances, the processors and/or associated transceivers may be located remotely from the autonomous vehicle train.

At block 804, a communication may be transmitted to the requesting autonomous vehicle, indicating that the requesting autonomous vehicle may join the autonomous vehicle train, e.g., via one or more processors and/or associated transceivers of one or more autonomous vehicles of the autonomous vehicle train. In some instances, prior to transmitting the communication to the requesting autonomous vehicle indicating that the requesting autonomous vehicle is allowed to join the autonomous vehicle train, the features, technologies and/or functionalities of the requesting autonomous vehicle may be verified, e.g., via one or more processors of the autonomous vehicle train, to ensure that the features, technologies and/or functionalities of the requesting autonomous vehicle meet a threshold minimum autonomous functionality requirement for joining the autonomous vehicle train.

At block 806, the speed of a first autonomous vehicle of the autonomous vehicle train and/or the speed of a second autonomous vehicle of the autonomous vehicle train may be adjusted, to allow the requesting autonomous vehicle to join the autonomous vehicle train, e.g., via one or more processors of the first and/or second autonomous vehicles of the autonomous vehicle train. For example, the speed of the first autonomous vehicle may be increased, while the speed of the second autonomous vehicle may be decreased, so that the requesting autonomous vehicle may join the train between the first autonomous vehicle and the second autonomous vehicle. In another example, the speed of a rear autonomous vehicle of the autonomous vehicle train may be increased or decreased to facilitate the requesting vehicle joining the autonomous vehicle train behind the rear autonomous vehicle. In some instances, the requesting autonomous vehicle may be directed to join the autonomous vehicle train at a particular speed or at a particular following distance.

At block 808, the distance between the first autonomous vehicle and the second autonomous vehicle of the autonomous vehicle train may be adjusted to allow the requesting autonomous vehicle to join the autonomous vehicle train, e.g., via one or more processors of the first and/or second autonomous vehicles of the autonomous vehicle train. For example, the distance between the first autonomous vehicle and the second autonomous vehicle may be increased so that the requesting autonomous vehicle may join the train between the first autonomous vehicle and the second autonomous vehicle.

After the requesting autonomous vehicle has joined the autonomous vehicle train, the speeds and/or distances of one or more autonomous vehicles of the autonomous vehicle train (including the requesting vehicle) may be adjusted additionally, e.g., via one or more processors of the one or more autonomous vehicles of the autonomous vehicle train. For example, the speeds of some or all of the autonomous vehicles of the autonomous vehicle train may be adjusted so that each vehicle travels at the same, or substantially the same, speed. Similarly, the distances between each consecutive vehicle of the autonomous vehicle train may be adjusted so that each autonomous vehicle maintains the same, or substantially the same, following distance.

In some instances, after the requesting autonomous vehicle has joined the autonomous vehicle train, an insurance quote and/or insurance discount for the requesting autonomous vehicle may be generated, based upon, e.g., traveling with the autonomous vehicle train, autonomous functionalities of the autonomous vehicle, and/or the threshold minimum autonomous functionality required for joining the autonomous vehicle train.

Other Matters

In some aspect, customers may opt-in to a rewards, loyalty, or other program. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of directing an autonomous vehicle to join an autonomous vehicle train, the computer-implemented method comprising:

receiving, via at least one of one or more processors or associated transceivers of the autonomous vehicle train, a request from a requesting autonomous vehicle that is not part of the autonomous vehicle train to join the autonomous vehicle train along a route;

determining, using autonomous vehicle data, a rendezvous point along the route based on one or more geographical locations by comparing, via the at least one of the one or more processors or the associated transceivers of the autonomous vehicle train, operational data of the autonomous vehicle train with vehicle data of the requesting autonomous vehicle;

transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route; and directing, via the at least one of the one or more processors or the associated transceivers of the autonomous vehicle train, the requesting autonomous vehicle to join the autonomous vehicle train at the rendezvous point along the route.

2. The computer-implemented method of claim 1, wherein receiving the request from the requesting autonomous vehicle occurs before the autonomous vehicle train begins to travel along the route.

3. The computer-implemented method of claim 1, wherein receiving the request from the requesting autonomous vehicle occurs while the autonomous vehicle train is travelling along the route.

4. The computer-implemented method of claim 1, wherein transmitting the communication occurs before the autonomous vehicle train is travelling along the route.

5. The computer-implemented method of claim 1, wherein transmitting the communication occurs while the autonomous vehicle train is travelling along the route.

6. The computer-implemented method of claim 1, wherein directing the requesting autonomous vehicle occurs before the autonomous vehicle train is traveling along the route.

7. The computer-implemented method of claim 1, wherein the method further comprises:

prior to transmitting the communication to the requesting autonomous vehicle authorizing the requesting autonomous vehicle to join the autonomous vehicle train, verifying, via the at least one of the one or more processors or the associated transceivers of the autonomous vehicle train, that the requesting autonomous vehicle is equipped with one or more autonomous vehicle systems to join the autonomous vehicle train, wherein at least one of:

(a) determining the rendezvous point along the route further comprises:

establishing, via the at least one of the one or more processors or the associated transceivers of the autonomous vehicle train, a time of arrival at the one or more geographical locations along the route; or (b) directing the requesting autonomous vehicle to join the autonomous vehicle train comprises:

transmitting, via the at least one of the one or more processors or the associated transceivers of the autonomous vehicle train, a communication to the requesting autonomous vehicle to maneuver the requesting autonomous vehicle to the rendezvous point; and facilitating, via the at least one of the one or more processors or the associated transceivers of the autonomous vehicle train, the requesting autonomous vehicle to dynamically join the autonomous vehicle train while the autonomous vehicle train is travelling towards a destination location of the requesting autonomous vehicle; or (c) facilitating the requesting autonomous vehicle to dynamically join the autonomous vehicle train further comprises:

establishing, via one or more processors or associated transceivers of the requesting autonomous vehicle, a communication with a lead autonomous vehicle, a rear autonomous vehicle, or another vehicle of the autonomous vehicle train to determine a rendezvous location within the autonomous vehicle train.

8. A system comprising one or more processors and one or more non-transitory computer-readable media storing computing instructions that, when executed on the one or more processors, cause the one or more processors to perform operations comprising:

receiving, via at least one of one or more processors or associated transceivers of an autonomous vehicle train, a request from a requesting autonomous vehicle that is not part of the autonomous vehicle train to join the autonomous vehicle train along a route;

determining, using autonomous vehicle data, a rendezvous point along the route based on one or more geographical locations by comparing, via the at least one of the one or more processors or the associated transceivers of the autonomous vehicle train, operational data of the autonomous vehicle train with vehicle data of the requesting autonomous vehicle;

transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route; and directing, via the at least one of the one or more processors or the associated transceivers of the autonomous vehicle train, the requesting autonomous vehicle to join the autonomous vehicle train at the rendezvous point along the route.

9. The system of claim 8, wherein receiving the request from the requesting autonomous vehicle occurs before the autonomous vehicle train begins to travel along the route.

10. The system of claim 8, wherein receiving the request from the requesting autonomous vehicle occurs while the autonomous vehicle train is travelling along the route.

11. The system of claim 8, wherein transmitting the communication occurs before the autonomous vehicle train is travelling along the route.

12. The system of claim 8, wherein transmitting the communication occurs while the autonomous vehicle train is travelling along the route.

13. The system of claim 8, wherein directing the requesting autonomous vehicle occurs before the autonomous vehicle train is traveling along the route.

14. The system of claim 8, wherein the operations further comprise prior to transmitting the communication to the requesting autonomous vehicle authorizing the requesting autonomous vehicle to join the autonomous vehicle train, verifying, via the at least one of the one or more processors or the associated transceivers of the autonomous vehicle train, that the requesting autonomous vehicle is equipped with one or more autonomous vehicle systems to join the autonomous vehicle train, wherein at least one of:

(a) determining the rendezvous point along the route further comprises:

establishing, via the at least one of the one or more processors or the associated transceivers of the autonomous vehicle train, a time of arrival at the one or more geographical locations along the route; or (b) directing the requesting autonomous vehicle to join the autonomous vehicle train comprises:

transmitting, via the at least one of the one or more processors or the associated transceivers of the autonomous vehicle train, a communication to the requesting autonomous vehicle to maneuver the requesting autonomous vehicle to the rendezvous point; and facilitating, via the at least one of the one or more processors or the associated transceivers of the autonomous vehicle train, the requesting autonomous vehicle to dynamically join the autonomous vehicle train while the autonomous vehicle train is travelling towards a destination location of the requesting autonomous vehicle; or (c) facilitating the requesting autonomous vehicle to dynamically join the autonomous vehicle train further comprises:

establishing, via one or more processors or associated transceivers of the requesting autonomous vehicle, a communication with a lead autonomous vehicle, a rear autonomous vehicle, or another vehicle of the autonomous vehicle train to determine a rendezvous location within the autonomous vehicle train.

15. One or more non-transitory computer-readable media storing computing instructions that when executed by one or more processors, cause the one or more processors to perform operations comprising:

receiving, via at least one of one or more processors or associated transceivers of an autonomous vehicle train, a request from a requesting autonomous vehicle that is not part of the autonomous vehicle train to join the autonomous vehicle train along a route;

determining, using autonomous vehicle data, a rendezvous point along the route based on one or more geographical locations by comparing, via the at least one of the one or more processors or the associated transceivers of the autonomous vehicle train, operational data of the autonomous vehicle train with vehicle data of the requesting autonomous vehicle;

transmitting, via the at least one of the one or more processors or the associated transceivers of the autonomous vehicle train, a communication to the requesting autonomous vehicle authorizing the requesting autonomous vehicle to join the autonomous vehicle train at the rendezvous point along the route; and directing, via the at least one of the one or more processors or the associated transceivers of the autonomous vehicle train, the requesting autonomous vehicle to join the autonomous vehicle train at the rendezvous point along the route.

16. The one or more non-transitory computer-readable media of claim 15, wherein receiving the request from the requesting autonomous vehicle occurs before the autonomous vehicle train begins to travel along the route.

17. The one or more non-transitory computer-readable media of claim 15, wherein receiving the request from the requesting autonomous vehicle occurs while the autonomous vehicle train is travelling along the route.

18. The one or more non-transitory computer-readable media of claim 15, wherein transmitting the communication occurs before the autonomous vehicle train is travelling along the route.

19. The one or more non-transitory computer-readable media of claim 15, wherein directing the requesting autonomous vehicle occurs before the autonomous vehicle train is traveling along the route.

20. The one or more non-transitory computer-readable media of claim 15, wherein the operations further comprise:

prior to transmitting the communication to the requesting autonomous vehicle authorizing the requesting autonomous vehicle to join the autonomous vehicle train, verifying, via the at least one of the one or more processors or the associated transceivers of the autonomous vehicle train, that the requesting autonomous vehicle is equipped with one or more autonomous vehicle systems to join the autonomous vehicle train, wherein at least one of:

(a) determining the rendezvous point along the route further comprises:

establishing, via the at least one of the one or more processors or the associated transceivers of the autonomous vehicle train, a time of arrival at the one or more geographical locations along the route; or (b) directing the requesting autonomous vehicle to join the autonomous vehicle train comprises:

transmitting, via the at least one of the one or more processors or the associated transceivers of the autonomous vehicle train, a communication to the requesting autonomous vehicle to maneuver the requesting autonomous vehicle to the rendezvous point; and facilitating, via the at least one of the one or more processors or the associated transceivers of the autonomous vehicle train, the requesting autonomous vehicle to dynamically join the autonomous vehicle train while the autonomous vehicle train is travelling towards a destination location of the requesting autonomous vehicle; or (c) facilitating the requesting autonomous vehicle to dynamically join the autonomous vehicle train further comprises:

establishing, via one or more processors or associated transceivers of the requesting autonomous vehicle, a communication with a lead autonomous vehicle, a rear autonomous vehicle, or another vehicle of the autonomous vehicle train to determine a rendezvous location within the autonomous vehicle train.

* * * * *